(12) United States Patent
Xue et al.

(10) Patent No.: US 11,483,803 B2
(45) Date of Patent: Oct. 25, 2022

(54) AUTONOMOUS SIDELINK OVER UNLICENSED BAND

(71) Applicant: QUALCOMM INCORPORATED, San Diego, CA (US)

(72) Inventors: Yisheng Xue, San Diego, CA (US); Chih-Hao Liu, San Diego, CA (US); Xiaoxia Zhang, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/247,121

(22) Filed: Nov. 30, 2020

(65) Prior Publication Data
US 2021/0219283 A1    Jul. 15, 2021

Related U.S. Application Data

(60) Provisional application No. 62/961,353, filed on Jan. 15, 2020.

(51) Int. Cl.
*H04W 28/26* (2009.01)
*H04W 72/04* (2009.01)
*H04W 74/08* (2009.01)

(52) U.S. Cl.
CPC ....... *H04W 72/0406* (2013.01); *H04W 28/26* (2013.01); *H04W 72/0453* (2013.01); *H04W 74/0833* (2013.01)

(58) Field of Classification Search
CPC .................................................. H04W 28/26
USPC ....................................................... 370/329
See application file for complete search history.

(56) References Cited

U.S. PATENT DOCUMENTS

2021/0368542 A1* 11/2021 Xue .................... H04W 72/042

\* cited by examiner

*Primary Examiner* — Dang T Ton
(74) *Attorney, Agent, or Firm* — Haynes and Boone, LLP

(57) ABSTRACT

Wireless communications systems and methods related to autonomous sidelink communication are provided. A first user equipment (UE) communicates, in a first subband of a plurality of subbands within a shared radio frequency band during a first time period, first sidelink control information (SCI) associated with a second subband of the plurality of subbands. The first UE communicates, with the second UE, first sidelink data in the second subband during the first time period based on the first SCI. The first UE communicates, with the second UE in the first subband during a second time period, second SCI associated with a third subband of the plurality of subbands, the third subband being different from the second subband based on a frequency hopping pattern. The first UE communicates, with the second UE, second sidelink data in the third subband during the second time period based on the second SCI.

30 Claims, 15 Drawing Sheets

AUTONOMOUS SIDELINK OVER UNLICENSED BAND

CROSS REFERENCE TO RELATED APPLICATIONS

The present application claims priority to and the benefit of U.S. Provisional patent Application No. 62/961,353, filed Jan. 15, 2020, which is hereby incorporated by reference in its entirety as if fully set forth below and for all applicable purposes.

TECHNICAL FIELD

This application relates to wireless communication systems, and more particularly to autonomous sidelink communication in a shared radio frequency band (e.g., in a shared spectrum or an unlicensed spectrum).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first user equipment (UE) with a second UE in a first subband of a plurality of subbands within a shared radio frequency band during a first time period, first sidelink control information (SCI) associated with a second subband of the plurality of subbands; communicating, by the first UE with the second UE, first sidelink data in the second subband during the first time period based on the first SCI; communicating, by the first UE with the second UE in the first subband during a second time period after the first time period, second SCI associated with a third subband of the plurality of subbands, the third subband being different from the second subband based on a frequency hopping pattern; and communicating, by the first UE with the second UE, second sidelink data in the third subband during the second time period based on the second SCI.

In an additional aspect of the disclosure, a first user equipment (UE) includes a transceiver configured to communicate, with a second UE in a first subband of a plurality of subbands within a shared radio frequency band during a first time period, first sidelink control information (SCI) associated with a second subband of the plurality of subbands; communicate, with the second UE, first sidelink data in the second subband during the first time period based on the first SCI; communicate, with the second UE in the first subband during a second time period after the first time period, second SCI associated with a third subband of the plurality of subbands, the third subband being different from the second subband based on a frequency hopping pattern; and communicate, with the second UE, second sidelink data in the third subband during the second time period based on the second SCI.

In an additional aspect of the disclosure, a non-transitory computer-readable medium having program code recorded thereon, the program code includes code for causing a first user equipment (UE) to communicate, with a second UE in a first subband of a plurality of subbands within a shared radio frequency band during a first time period, first sidelink control information (SCI) associated with a second subband of the plurality of subbands; code for causing the first UE to communicate, with the second UE, first sidelink data in the second subband during the first time period based on the first SCI; code for causing the first UE to communicate, with the second UE in the first subband during a second time period after the first time period, second SCI associated with a third subband of the plurality of subbands, the third subband being different from the second subband based on a frequency hopping pattern; and code for causing the first UE to communicate, with the second UE, second sidelink data in the third subband during the second time period based on the second SCI.

In an additional aspect of the disclosure, a first user equipment (UE) includes means for communicating, with a second UE in a first subband of a plurality of subbands within a shared radio frequency band during a first time period, first sidelink control information (SCI) associated with a second subband of the plurality of subbands; means for communicating, with the second UE, first sidelink data in the second subband during the first time period based on the first SCI; means for communicating, with the second UE in the first subband during a second time period after the first time period, second SCI associated with a third subband of the plurality of subbands, the third subband being different from the second subband based on a frequency hopping pattern; and means for communicating, with the second UE, second sidelink data in the third subband during the second time period based on the second SCI.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
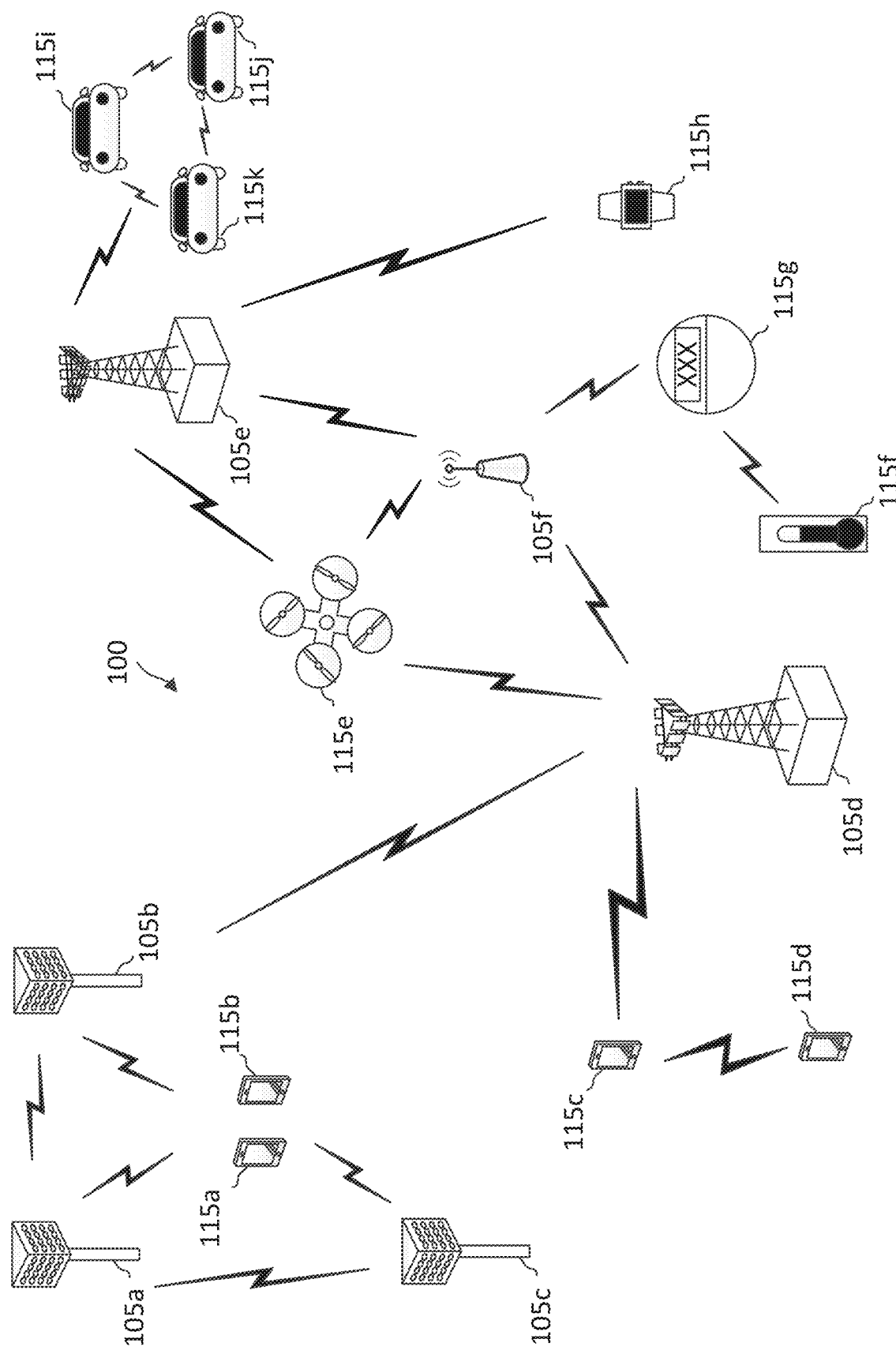
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include vehicle-to-everything (V2X), industrial IoT (IIoT), and/or NR-lite.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication.

The deployment of NR over an unlicensed spectrum is referred to as NR-unlicensed (NR-U). Some studies have been conducted for NR-U deployment over 5 gigahertz (GHz) unlicensed bands. Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink can benefit from utilizing the additional bandwidth available in an unlicensed spectrum. However, channel access in a certain unlicensed spectrum may be regulated by authorities. For instance, regulations in a 2.4 GHz band allows a node to transmit without performing an LBT when the node applies frequency-hopping to transmissions and satisfies a transmission sequence or on/off pattern with a maximum transmission duration of about 5 ms and a minimum silent or gap duration of about 5 ms between transmissions.

The present application describes mechanisms for sidelink UEs to perform autonomous sidelink communications in a synchronous sidelink system operating over a shared radio frequency band (e.g., in a shared radio spectrum or an unlicensed spectrum) having a certain channel access requirement. For instance, the shared radio frequency band may be a 2.4 GHz unlicensed band restricting channel access to be frequency-hopping based and according to a certain transmission on/off sequence when no LBT is used. To satisfy the frequency-hopping based access, the shared radio frequency band can be partitioned into a plurality of subbands, where a first subband of the plurality of subbands may be configured as an anchor channel for SCI communications and remaining subbands may be configured as PSSCHs for sidelink data communications. For example, a first UE may transmit, in the first subband during a first time period, first SCI associated with a second subband of the plurality of subbands and may transmit first sidelink data in the first subband during the first time period based on the first SCI. The first UE may transmit, in the first subband during a second time period after the first time period, second SCI associated with a third subband of the plurality of subbands different from the second subband and may transmit second sidelink data in the third subband during the second time period based on the second SCI. The transmission of the first sidelink data in the second subband followed by the transmission of the second sidelink data in the third subband may be based on a frequency-hopping pattern.

In some aspects, the first subband includes a plurality of PSCCHs multiplexed in at least one of time or frequency in a first portion of the first time period, where the first SCI is communicated in a first PSSCH of the plurality of PSCCH and the first sidelink data is communicated in a second portion of the first time period. In some aspects, the first SCI may indicate a reservation for the third subband in the second time period based on the frequency-hopping pattern. In some aspects, the first SCI and/or the second SCI may include a configuration of the frequency-hopping pattern. As such, other sidelink UEs may learn the frequency-hopping pattern, predict PSSCH occupancies of the first UE based on the frequency-hopping pattern, and select and/or reserve PSSCHs based on the predicted occupancies so that collision may be minimized.

To satisfy the transmission sequence, the first time period and the second time period may each have a duration satisfying the maximum transmission duration and may be spaced apart by a third time period satisfying the transmission gap. The first UE may monitor for SCI during the third time period. In some instances, the first UE may determine whether there is sidelink data destined for the first UE in the third time period based on the monitoring. If there is sidelink data destined for the first UE, the first UE may receive the sidelink data. If there is no sidelink data destined for the first UE in the third time period, the first UE may switch one or more frontend components at the first UE to a low-power mode or a power-off mode during the third time period for power saving. Alternatively, if there is no sidelink data destined for the first UE in the third time period, the first UE may perform opportunistic data reception during the third time period. For instance, the first UE may indicate, for example, in the first SCI, a subband in which the first UE may monitor for opportunistic data reception during the third time period. In some aspects, the first UE may monitor for SCI during the third time period and analyze decoded SCI to determine whether there is any SCI reservation collision in a fourth time period after the second time period. Upon detecting an SCI reservation collision, the first UE may broadcast information associated with the reservation collision so that UEs associated with the collision may be aware of the potential collision and perform collision handling.

In some aspects, the first UE may transmit, in the first subband during a third time period adjacent to the first time period, third SCI indicating a fourth subband of the plurality of subbands for receiving third sidelink data and a reservation for the second subband in the first time period. Subsequently, the first UE may receive the third sidelink data in the fourth subband based on the third SCI.

In some aspects, the first SCI may indicate that the second subband is for transmission during a first portion of the first time period and for reception during a second portion of the first time period. Thus, the first UE may transmit the first sidelink data in the second subband during the first portion and receive third sidelink data during the second portion.

Aspects of the present disclosure can provide several benefits. For example, the use of an anchor channel for SCI communication with frequency-hopping PSSCHs can reduce SCI sensing complexity while satisfying the frequency-hopping based channel access. The anchor channel allows a monitoring sidelink UE to monitor a single subband for SCI sensing and decoding instead of having to hop across multiple subbands. The use of interleaving transmission durations and receive durations allows sidelink UEs to satisfy the transmission sequence requirement (e.g., transmission gaps between transmissions) of the shared radio frequency band. The inclusion of SCI reservation analysis and SCI reservation collision detection and/or broadcast can minimize intra-system collisions, and thus may improve sidelink performance. By allowing SCIs to be transmitted in consecutive time periods to occupy a channel as a receiver and/or transmitter can provide a greater flexibility for sidelink UEs to meet certain transmission and/or feedback latency requirements for sidelink communications. The disclosed aspects are suitable for sidelink UEs that utilize narrowband transmitters and/or narrowband receivers. While the disclosed aspects are described in the context of deploying sidelink over a 2.4 GHz unlicensed band, the disclosed aspects are suitable for use over any unlicensed band and/or shared frequency band that restrict channel access to be based on frequency-hopping and satisfying a certain transmission on/off pattern.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105*f* may be a small cell BS which may be a home node or portable access point. ABS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs)

and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a I-IARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, which may be shared by multiple network operating entities using various radio access technologies (RATs) such as NR-U, WiFi, and/or licensed-assisted access (LAA) as shown in FIG. 2.

Figure 2:
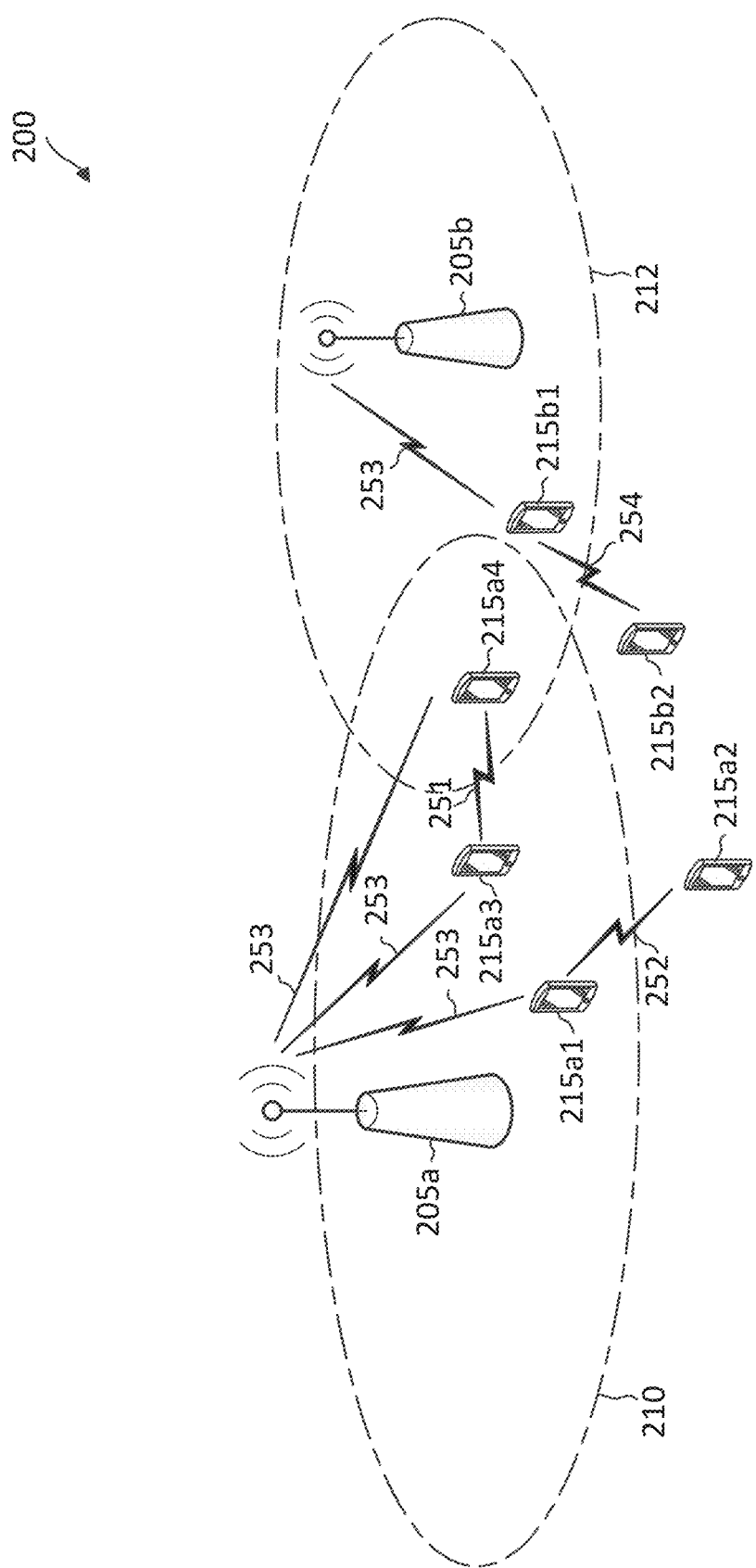
FIG. 2 illustrates a wireless communication network that provisions for sidelink communications according to some aspects of the present disclosure.

FIG. 2 illustrates an example of a wireless communication network 200 that provisions for sidelink communications according to aspects of the present disclosure. The network 200 may correspond to a portion of the network 100. FIG. 2 illustrates two BSs 205 (shown as 205a and 205b) and six UEs 215 (shown as 215a1, 215a2, 215a3, 215a4, 215b1, and 215b2) for purposes of simplicity of discussion, though it will be recognized that aspects of the present disclosure may scale to any suitable number of UEs 215 (e.g., the about 2, 3, 4, 5, 7 or more) and/or BSs 205 (e.g., the about 1, 3 or more). The BS 205 and the UEs 215 may be similar to the BSs 105 and the UEs 115, respectively. The BSs 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

The BS 205a and the UEs 215a1-215a4 may be operated by a first network operating entity. The BS 205b and the UEs 215b1-215b2 may be operated by a second network operating entity. In some aspects, the first network operating entity may utilize a same RAT as the second network operating entity. For instance, the BS 205a and the UEs 215a1-215a4 of the first network operating entity and the BS 205b and the UEs 215b1-215b2 of the second network operating entity are NR-U devices. In some other aspects, the first network operating entity may utilize a different RAT than the second network operating entity. For instance, the BS 205a and the UEs 215a1-215a4 of the first network operating entity may utilize NR-U technology while the BS 205b and the UEs 215b1-215b2 of the second network operating entity may utilize WiFi or LAA technology.

In the network 200, some of the UEs 215a1-215a4 may communicate with each other in peer-to-peer communications. For example, the UE 215a1 may communicate with the UE 215a2 over a sidelink 252, the UE 215a3 may communicate with the UE 215a4 over another sidelink 251, and the UE 215b1 may communicate with the UE 215b2 over yet another sidelink 254. The sidelinks 251, 252, and 254 are unicast bidirectional links. Some of the UEs 215 may also communicate with the BS 205a or the BS 205b in a UL direction and/or a DL direction via communication links 253. For instance, the UE 215a1, 215a3, and 215a4 are within a coverage area 210 of the BS 205a, and thus may be in communication with the BS 205a. The UE 215a2 is outside the coverage area 210, and thus may not be in direct communication with the BS 205a. In some instances, the UE 215a1 may operate as a relay for the UE 215a2 to reach the BS 205a. Similarly, the UE 215b1 is within a coverage area 212 of the BS 205b, and thus may be in communication with the BS 205b and may operate as a relay for the UE 215b2 to reach the BS 205b. In some aspects, some of the UEs 215 are associated with vehicles (e.g., similar to the UEs 115i-k) and the communications over the sidelinks 251, 252, and 254 may be C-V2X communications. C-V2X communications may refer to communications between vehicles and any other wireless communication devices in a cellular network.

As discussed above, NR supports an autonomous RRA in mode-2 for sidelink. In the current NR sidelink framework, sidelink UEs may indicate sidelink resource reservations via SCI as shown FIG. 3. Intra-technology, intra-operator sidelink collisions (among NR sidelink UEs) are controlled via SCI sensing. The intra-technology, intra-operator side collisions can further be controlled by applying channel busy ratio (CBR)-based and/or channel access occupancy ratio (CR)-based techniques as discussed in greater detail herein.

Figure 3:
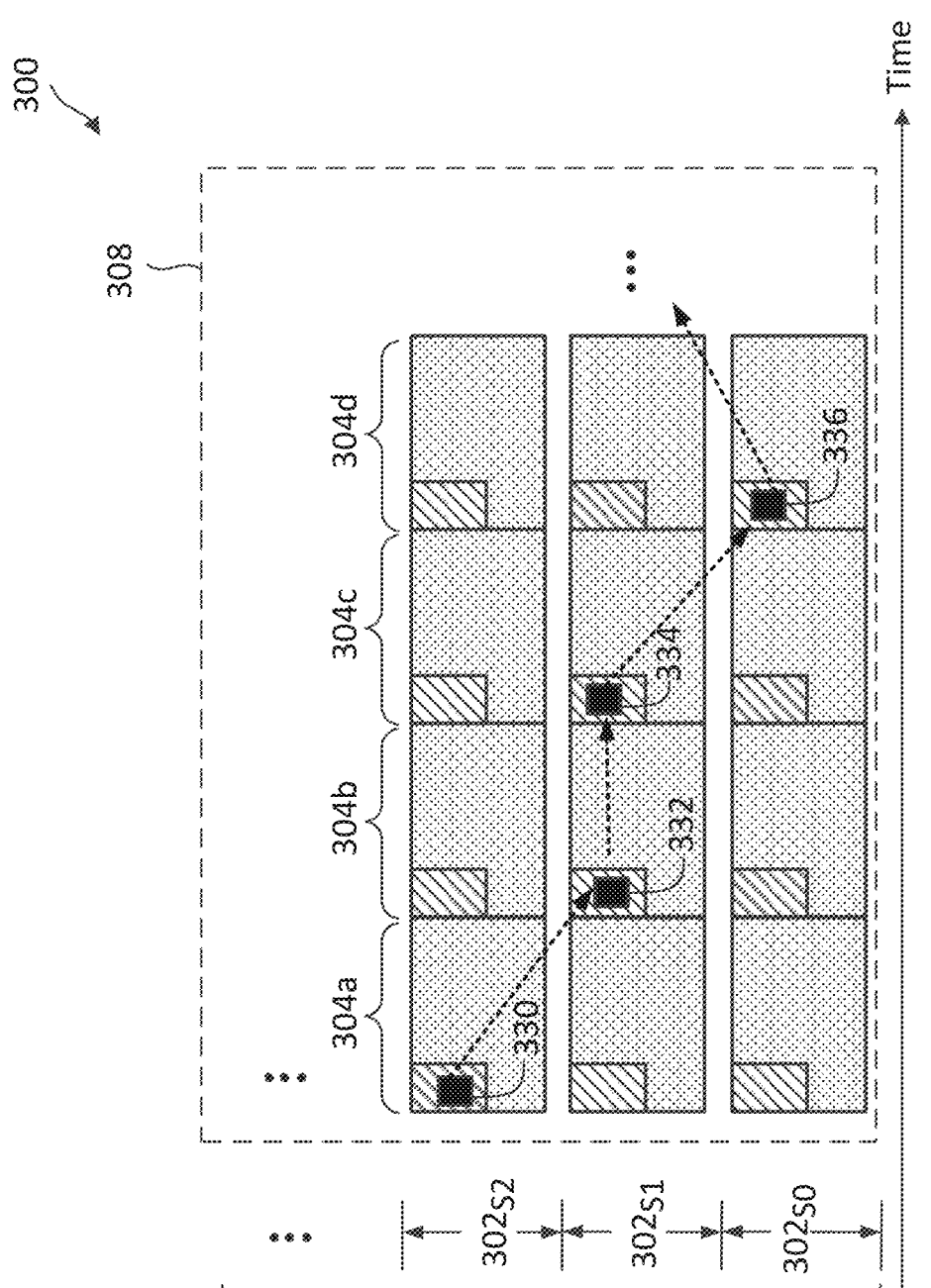
FIG. 3 illustrates a sidelink communication scheme according to some aspects of the present disclosure.
Figure 3:
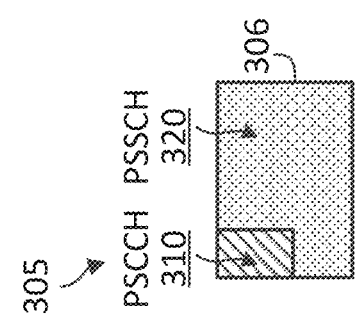

FIG. 3 illustrates a sidelink communication scheme 300 according to some aspects of the present disclosure. The scheme 300 may be employed by UEs such as the UEs 115 and/or 215 in a network such as the networks 100 and/or 200. In particular, sidelink UEs may employ the scheme 300 to communicate sidelink over a shared radio frequency band (e.g., in a shared spectrum or an unlicensed spectrum). The shared radio frequency band may be shared by multiple RATs as discussed in FIG. 2. In FIG. 3, the x-axis represents time in some arbitrary units, and the y-axis represents frequency in some arbitrary units.

In the scheme 300, a shared radio frequency band 301 is partitioned into a plurality of subchannels or frequency subbands 302 (shown as $302_{S0}$, $302_{S1}$, $302_{S2}$, . . . ) in frequency and a plurality of sidelink frames 304 (shown as 304a, 304b, 304c, 304d, . . . ) in time for sidelink communication. The frequency band 301 may be at any suitable frequencies (e.g., at about 2.4 GHz, 5 GHz, or 6 GHz). The frequency band 301 may have any suitable BW and may be partitioned into any suitable number of frequency subbands 302. The number of frequency subbands 302 can be dependent on the sidelink communication BW requirement. The frequency band 301 may be at any suitable frequencies. In some aspects, the frequency band 301 is a 2.4 GHz unlicensed band and may have a bandwidth of about 80 megahertz (MHz) partitioned into about fifteen 5 MHz frequency subbands 302.

Each sidelink frame 304 includes a sidelink resource 306 in each frequency subband 302. A legend 305 indicates the types of sidelink channels within a sidelink resource 306. In some instances, there can be a frequency gap or guard band between adjacent frequency subbands 302 as shown in FIG. 3, for example, to mitigate adjacent band interference. The sidelink resource 306 may have a substantially similar structure as an NR sidelink resource. For instance, the sidelink resource 306 may include a number of subcarriers or RBs in frequency and a number of symbols in time. In some instances, the sidelink resource 306 may have a duration between about one millisecond (ms) to about 20 ms. Each sidelink resource 306 may include a PSCCH 310 and a PSSCH 320. The PSCCH 310 and the PSSCH 320 can be multiplexed in time and/or frequency. In the illustrated example of FIG. 3, for each sidelink resource 306, the PSCCH 310 is located during the beginning symbol(s) (e.g., about 1 symbol or about 2 symbols) of the sidelink resource 306 and occupies a portion of a corresponding frequency subband 302, and the PSSCH 320 occupies the remaining time-frequency resources in the sidelink resource 306. In some instances, a sidelink resource 306 may also include a physical sidelink feedback channel (PSFCH), for example, located during the ending symbol(s) of the sidelink resource 306. In general, a PSCCH 310, a PSSCH 320, and/or a PSFCH may be multiplexed in any suitable configuration within a sidelink resource 306.

The PSCCH 310 can be used for carrying SCI 330. The PSSCH 320 can be used for carrying sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 306

In an NR sidelink frame structure, the sidelink frames 304 in a resource pool 308 may be contiguous in time. A sidelink UE (e.g., the UEs 115 and/or 215) may include, in SCI 330, a reservation for a sidelink resource 306 in a later sidelink frame 304. Thus, another sidelink UE (e.g., a UE in the same NR-U sidelink system) may perform SCI sensing in the resource pool 308 to determine whether a sidelink resource 306 is available or occupied. For instance, if the sidelink UE detected SCI indicating a reservation for a sidelink resource 306, the sidelink UE may refrain from transmitting in the reserved sidelink resource 306. If the sidelink UE determines that there is no reservation detected for a sidelink resource 306, the sidelink UE may transmit in the sidelink resource 306. As such, SCI sensing can assist a UE in identifying a target frequency subband 302 to reserve for sidelink communication and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 302 in one sidelink frame 304 to another frequency subband 302 in another sidelink frame 304. In the illustrated example of FIG. 3, during the sidelink frame 304a, the sidelink UE transmits SCI 330 in the sidelink resource 306 located in the frequency subband $302_{S2}$ to reserve a sidelink resource 306 in a next sidelink frame 304b located at the frequency subband $302_{S1}$. Similarly, during the sidelink frame 304b, the sidelink UE transmits SCI 332 in the sidelink resource 306 located in the frequency subband $302_{S1}$ to reserve a sidelink resource 306 in a next sidelink frame 304c located at the frequency subband $302_{S1}$. During the sidelink frame 304c, the sidelink UE transmits SCI 334 in the sidelink resource 306 located in the frequency subband $302_{S1}$ to reserve a sidelink resource 306 in a next sidelink frame 304d located at the frequency subband $302_{S0}$. During the sidelink frame 304d, the sidelink UE transmits SCI 336 in the sidelink resource 306 located in the frequency subband $302_{S0}$. The SCI 336 may reserve a sidelink resource 306 in a later sidelink frame 304.

The SCI can also indicate scheduling information and/or a destination identifier (ID) identifying a target receiving sidelink UE for the next sidelink resource 306. Thus, a sidelink UE may monitor SCI transmitted by other sidelink UEs. Upon detecting SCI in a sidelink resource 306, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 304 in different frequency subband (e.g., via FDM). For instance, in the sidelink frame 304b, one pair of sidelink UEs may communicate sidelink data using a sidelink resource 306 in the frequency subband $302_{S2}$ while another pair of sidelink UEs may communicates sidelink data using a sidelink resource 306 in the frequency subband $302_{S1}$.

In some aspects, the scheme 300 is used for synchronous sidelink communication. In other words, the sidelink UEs are synchronized in time and are aligned in terms of symbol boundary, sidelink resource boundary (e.g., the starting time of sidelink frames 304). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 308 in the frequency band 301, for example, while in a coverage of a serving BS. The resource pool 308 may include a plurality of sidelink resources 306. The BS can configure the sidelink UE with a resource pool configuration indicating resources in the frequency band 301 and/or the subbands 302 and/or timing information associated with the sidelink frames 304.

Figure 4:
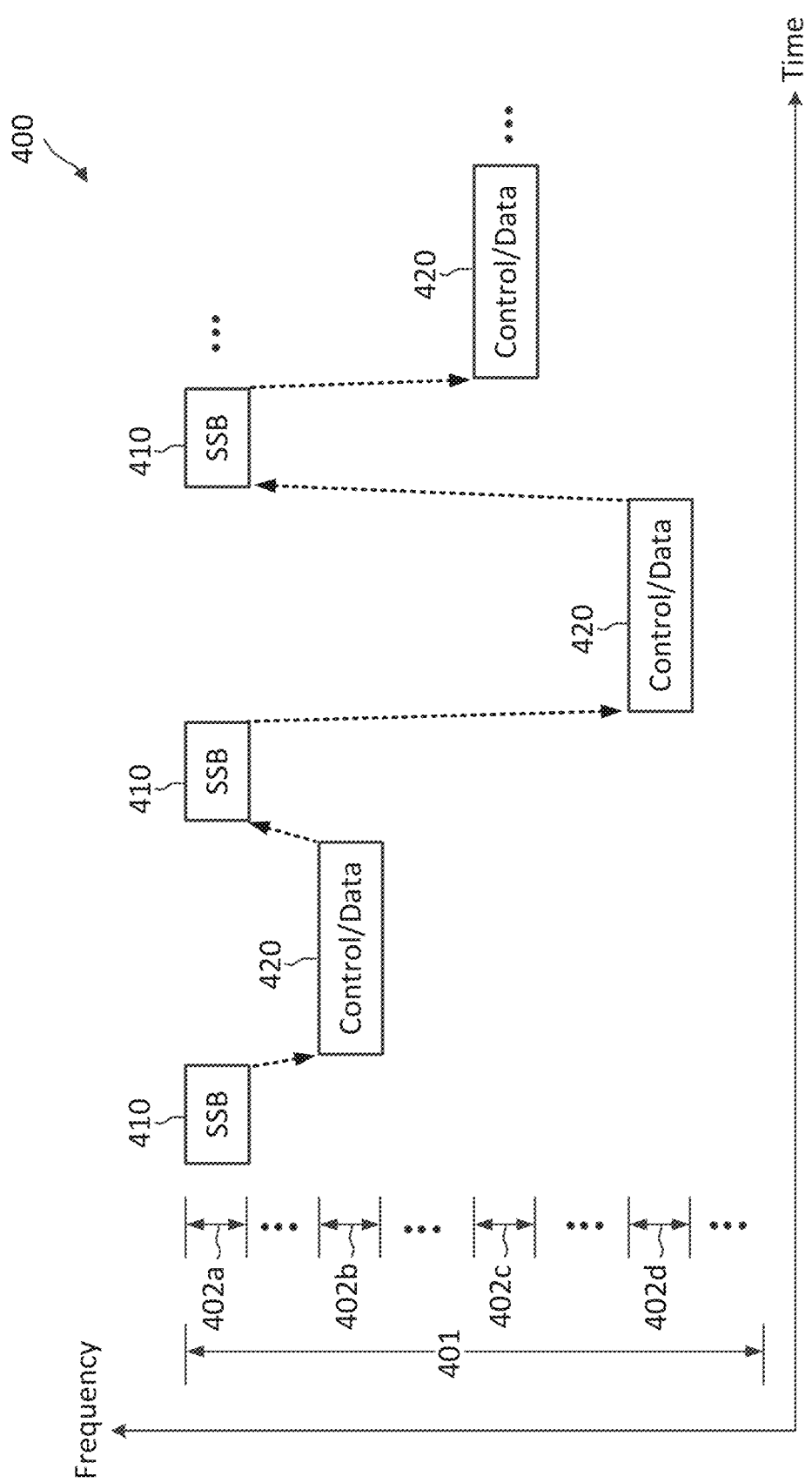
FIG. 4 illustrates a communication scheme with frequency-hopping according to some aspects of the present disclosure.

FIG. 4 illustrates a communication scheme 400 with frequency-hopping according to aspects of the present disclosure. The scheme 400 may be employed by BSs such as the BSs 105 and UEs such as the UEs 115 and/or 215 in a network such as the networks 100 and/or 200. In particular, the BSs and/or UEs may transmit in a shared radio frequency band (e.g., in a shared spectrum or an unlicensed spectrum) based on narrowband access as shown the scheme 300. For instance, the BSs and/or the UEs may utilize narrowband transmitters and narrowband receivers for narrowband communications (e.g., in narrowband IoT applications) when employing the scheme 400. In FIG. 4, the x-axis represents time in some arbitrary units, and the y-axis represents frequency in some arbitrary units.

In the scheme 400, a shared radio frequency band 401 is partitioned into a plurality of subchannels or frequency subbands 402 (shown as 402a, 402b, 402c, 402d, . . . ) in frequency. The frequency band 401 and the frequency subbands 402 may be substantially similar to the frequency band 301 and the frequency subbands 302, respectively. In some aspects, the frequency band 401 may be a 2.4 GHz unlicensed band with a BW of about 80 MHz and may be partitioned into about fifteen subbands 402 each having a BW of about 5 MHz.

To facilitate synchronization and system information acquisition with frequency-hopping control/data communication, a BS (e.g., the BSs 105) may configure one of the frequency subbands 402 as an anchor channel for synchronization signals and system information transmission and the remaining frequency subbands 402 as frequency-hopping channels for control (e.g., PDCCH) and/or data (e.g., PDSCH) communications 420. In the illustrated example of FIG. 4, the BS configures the frequency subband 402a as an anchor channel. The BS may transmit SSBs 410 in the anchor channel. The SSBs 410 may include a PSS, an SSS, and/or a PBCH signals. The transmission of SSBs 410 in the same anchor channel can allow a UE (e.g., the UEs 115 and/or 215) to monitor a single channel for synchronization signals and/or system information from the BS. To satisfy frequency hopping, the BS may hop across the different frequency subbands 402 for control and/or data communications 420. For instance, the BS may communicate control and/or data 420 with a UE in the frequency subband 402b during one time period and in a different frequency band 402d during another time period based on a frequency-hopping pattern. In other words, each of the BS and the UE may switch or hop from one frequency subband 402 to another frequency subband 402 for control and/or data communication 420. While not shown, in some aspects, the BS and/or the UE may perform an LBT in a frequency subband 402 prior to transmitting in the frequency subband 402.

Regulations in a 2.4 GHz unlicensed band allow frequency-hopping based channel access without LBTs provided that that the channel access has a maximum transmission time of about 5 millisecond (ms) and a minimum gap time of about 5 ms between transmissions. In other words, a transmission sequence may hop from one frequency channel or frequency subband to another frequency channel or frequency subband for transmissions and may have an on/off pattern with active transmission durations interleaved with transmission gaps. The present disclosure provides techniques for sidelink UEs configured with a mode-2 RRA to communicate over a radio frequency band, such as a 2.4 GHz unlicensed band, with frequency-hopping and transmission on/off or duty cycle requirements.

Figure 5:
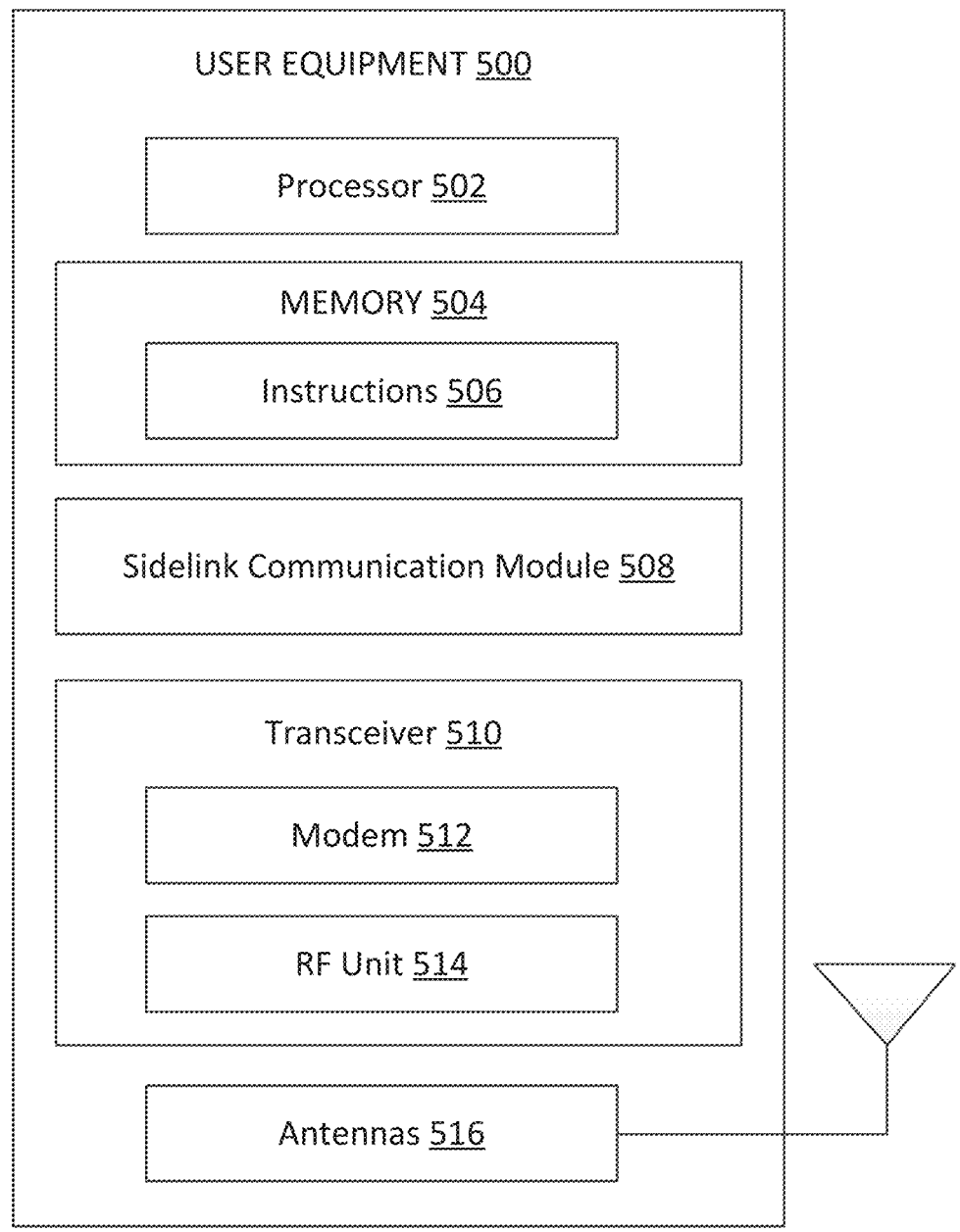
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1 or a UE 215 discussed above in FIG. 2. As shown, the UE 500 may include a processor 502, a memory 504, a sidelink communication module 508, a transceiver 510 including a modem subsystem 512 and a radio frequency (RF) unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-4 and 7-9, 10A-10B, and 11-14. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 508 may be implemented via hardware, software, or combinations thereof. For example, the sidelink communication module 508 may be implemented as a processor, circuit, and/or instructions 506 stored in the memory 504 and executed by the processor 502. In some instances, the sidelink communication module 508 can be integrated within the modem subsystem 512. For example, the sidelink communication module 508 can be implemented by a combination of software components (e.g., executed by a DSP or a general processor) and hardware components (e.g., logic gates and circuitry) within the modem subsystem 512.

The sidelink communication module 508 may be used for various aspects of the present disclosure, for example, aspects of FIGS. 1-4 and 7-9, 10A-10B, and 11-14. For instance, the sidelink communication module 508 is configured to transmit, in a first subband of a plurality of subbands within a shared radio frequency band during a first time period, first SCI associated with a second subband of the plurality of subbands, transmit first sidelink data in the first subband during the first time period based on the first SCI, transmit, in the first subband during a second time period after the first time period, second SCI associated with a third subband of the plurality of subbands different from the second subband, and transmit second sidelink data in the third subband during the second time period based on the second SCI. The transmission of the first sidelink data in the second subband followed by the transmission of the second sidelink data in the third subband may be based on a frequency-hopping pattern.

In some aspects, the first subband includes a plurality of PSCCHs multiplexed in at least one of time or frequency in a first portion of the first time period, where the first SCI is communicated in a first PSSCH of the plurality of PSCCH and the first sidelink data is communicated in a second portion of the first time period. In some aspects, the sidelink communication module 508 is further configured to configure the first SCI to indicate a reservation for the third subband in the second time period based on the frequency-hopping pattern. In some aspects, the sidelink communication module 508 is further configured to configure the first SCI and/or the second SCI to include a configuration of the frequency-hopping pattern.

In some aspects, the first time period and the second time period may each have a duration satisfying a maximum transmission duration parameter (e.g., about 5 ms) of the shared radio frequency band and may be spaced apart by a third time period satisfying a minimum transmission gap parameter (e.g., about 5 ms) of the shared radio frequency band. The sidelink communication module 508 is further configured to monitor for SCI during the third time period. In some instances, the sidelink communication module 508 is further configured to determine whether there is sidelink data destined for the UE 500 in the third time period based on the monitoring by performing SCI blind decoding and determine whether any decoded SCI indicates a destination ID identifying the UE 500, receive sidelink data during the third time period if there is sidelink data destined for the UE 500, switch one or more frontend components at the RF unit 514 to a low-power mode or a power-off mode during the third time period or perform opportunistic data reception if there is no sidelink data destined for the UE 500 in the third time period.

In some aspects, the sidelink communication module 508 is further configured to monitor for SCI during the third time period, analyze decoded SCI to determine whether there is any SCI reservation collision in a fourth time period after the second time period, and broadcast information associated with the reservation collision upon detecting an SCI reservation collision. In some aspects, the sidelink communication module 508 is further configured to monitor for SCI reservation collision information and perform collision handling if the UE 500 is the UE that causes the reservation collision.

In some aspects, the sidelink communication module 508 is further configured to transmit, in the first subband during a third time period adjacent to the first time period, third SCI indicating a fourth subband of the plurality of subbands for receiving third sidelink data and a reservation for the second subband in the first time period and receive the third sidelink data in the fourth subband based on the third SCI.

In some aspects, the sidelink communication module 508 is further configured to configure the first SCI to indicate that the second subband is for transmission during a first portion of the first time period and for reception during a second portion of the first time period. Thus, the sidelink communication module 508 is further configured to transmit the first sidelink data in the second subband during the first portion and receive third sidelink data during the second portion. Mechanisms for performing autonomous sidelink communications with frequency-hopping based channel access and according to a certain transmission sequence are described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the sidelink communication module 508 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., SCI, sidelink data, synchronization signal, SCI reservation collision information, SSBs) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., sidelink configuration, SCI, sidelink data, SCI reservation collision information, synchronization signal, SSBs) to the sidelink communication module 508 for processing. The antennas 516 may include multiple antennas of similar or different designs in order to sustain multiple transmission links. The RF unit 514 may configure the antennas 516. In some aspects, the RF unit 514 may include various RF components, such as local oscillator (LO), analog filters, and/or mixers. The LO and the mixers can be configured based on a certain channel center frequency (e.g., the channel center frequency of the subbands 702 of FIG. 7). The analog filters may be configured to have a certain passband depending on a channel BW (e.g., the BW of the subbands 702 of FIG. 7). The RF components may be configured to operate at various power modes (e.g., a normal power mode, a low-power mode, power-off mode) and may be switched among the different power modes depending on transmission and/or reception requirements at the UE 500.

In some aspects, the transceiver 510 is coupled to the processor 502 and configured to communicate, in a first subband of a plurality of subbands within a shared radio frequency band during a first time period, first SCI associated with a second subband of the plurality of subbands, communicate first sidelink data in the first subband during the first time period based on the first SCI, communicate, in the first subband during a second time period after the first time period, second SCI associated with a third subband of the plurality of subbands different from the second subband based on a frequency-hopping pattern, and communicate second sidelink data in the third subband during the second time period based on the second SCI, for example, by coordinating with the sidelink communication module 508. In some instances, the transceiver 510 is configured to communicate the first SCI, the first sidelink data, the second SCI, and the second sidelink data by transmitting the first SCI, the first sidelink data, the second SCI, and the second sidelink data, respectively. In some instances, the transceiver 510 is configured to communicate the first SCI, the first sidelink data, the second SCI, and the second sidelink data by receiving the first SCI, the first sidelink data, the second SCI, and the second sidelink data, respectively.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
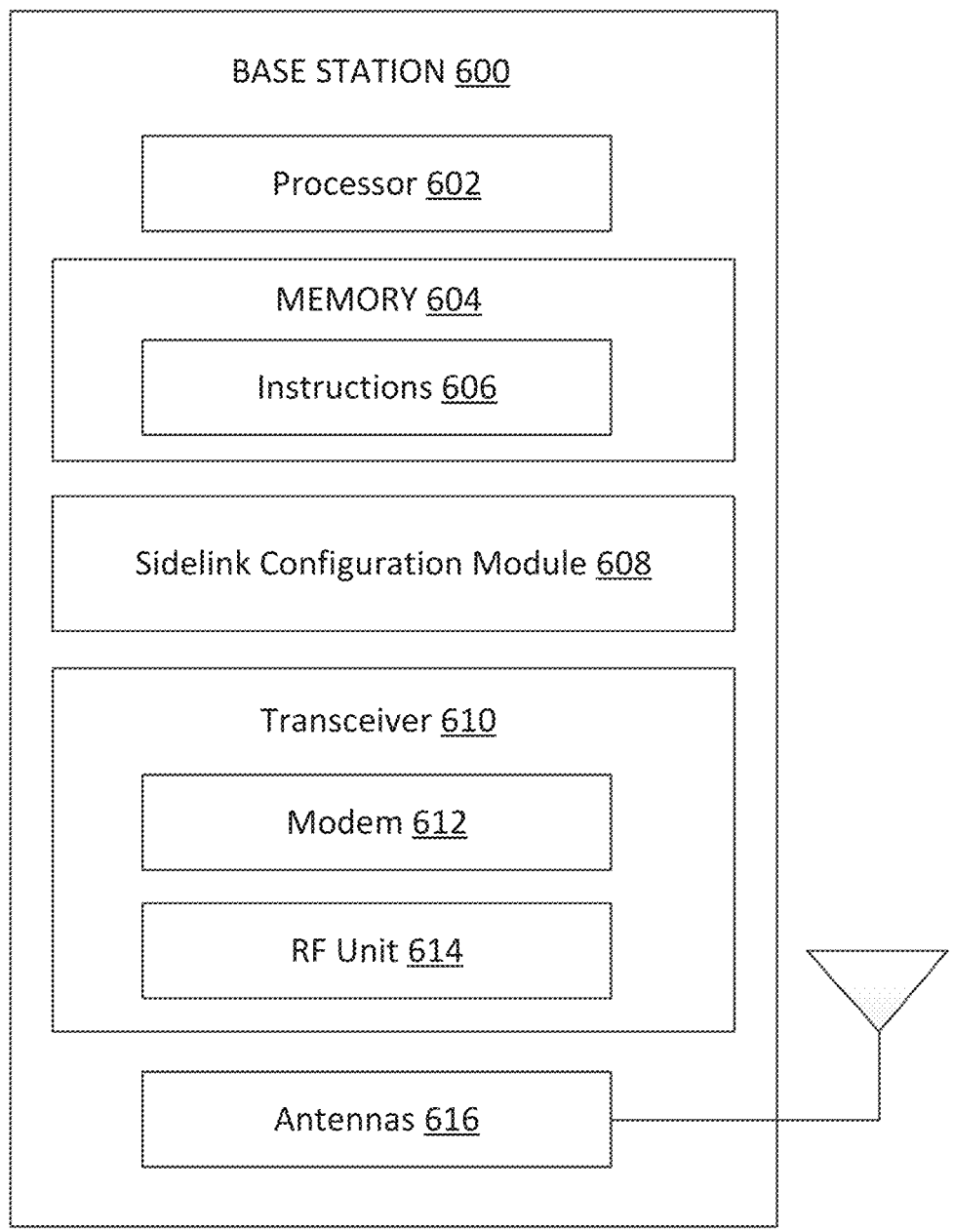
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1 or a BS 205 in the network 200 as discussed above in FIG. 2. As shown, the BS 600 may include a processor 602, a memory 604, a sidelink configuration module 608, a transceiver 610 including a modem subsystem 612 and a RF unit 614, and one or more antennas 616. These elements may be coupled with each other. The term "coupled" may refer to directly or indirectly coupled or connected to one or more intervening elements. For instance, these elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4 and 7-9, 10A-10B, and 11-13. Instructions 606 may also be referred to as code, which may be interpreted broadly to include any type of computer-readable statement(s) as discussed above with respect to FIG. 5.

The sidelink configuration module 608 may be implemented via hardware, software, or combinations thereof. For example, the sidelink configuration module 608 may be implemented as a processor, circuit, and/or instructions 606 stored in the memory 604 and executed by the processor 602. In some instances, the sidelink configuration module 608 can be integrated within the modem subsystem 612. For example, the sidelink configuration module 608 can be implemented by a combination of software components (e.g., executed by a DSP or a general processor) and hardware components (e.g., logic gates and circuitry) within the modem subsystem 612.

The sidelink configuration module 608 may be used for various aspects of the present disclosure, for example, aspects of FIGS. 1-4 and 7-9, 10A-10B, and 11-13. For instance, the sidelink configuration module 608 is configured to transmit, to a UE (e.g., the UEs 115, 215, and/or 500), a sidelink configuration indicating a sidelink resource pool (e.g., the sidelink resource pool 708 of FIG. 7 and/or the sidelink resource pool 1308 of FIG. 13) and/or sidelink communication parameter. The sidelink configuration may indicate time-frequency resources in the sidelink resource pool. For instance, the configuration may indicate frequency band information (e.g., the frequency band 701, anchor channel where PSCCHs are located, a PSCCH multiplex configuration, the PSSCHs for frequency-hopping base access), PSCCH-to-PSSCH mapping, and/or sidelink frame timing information. The sidelink communication parameter may include frequency-hopping pattern. In some aspects, the sidelink configuration module 608 is configured to transmit a CBR/CR table to the UE. The CBR/CR table may include entries indicating allowable CRs for transmitter-originated SCI and allowable CRs for receiver-originated SCI at given CBRs to control intra-system collision as discussed in greater detail herein. In some aspects, the sidelink configuration module 608 is configured to transmit SSBs to facilitate synchronization at UEs for synchronous sidelink communications. Mechanisms for configuring sidelink UEs for channel access in a shared radio frequency band and/or an unlicensed band are described in greater detail herein.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., PDCCH, PDSCH, SSBs, sidelink configuration, sidelink resource pool configuration, SSBs, frequency hopping patterns for sidelink communication) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices and provide the received data messages for processing and/or demodulation at the transceiver 610. The transceiver 610 may provide the demodulated and decoded data (e.g., CBR reports and/or CR reports) to the sidelink configuration module 608 for processing. The antennas 616 may include multiple antennas of similar or different designs in order to sustain multiple transmission links.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
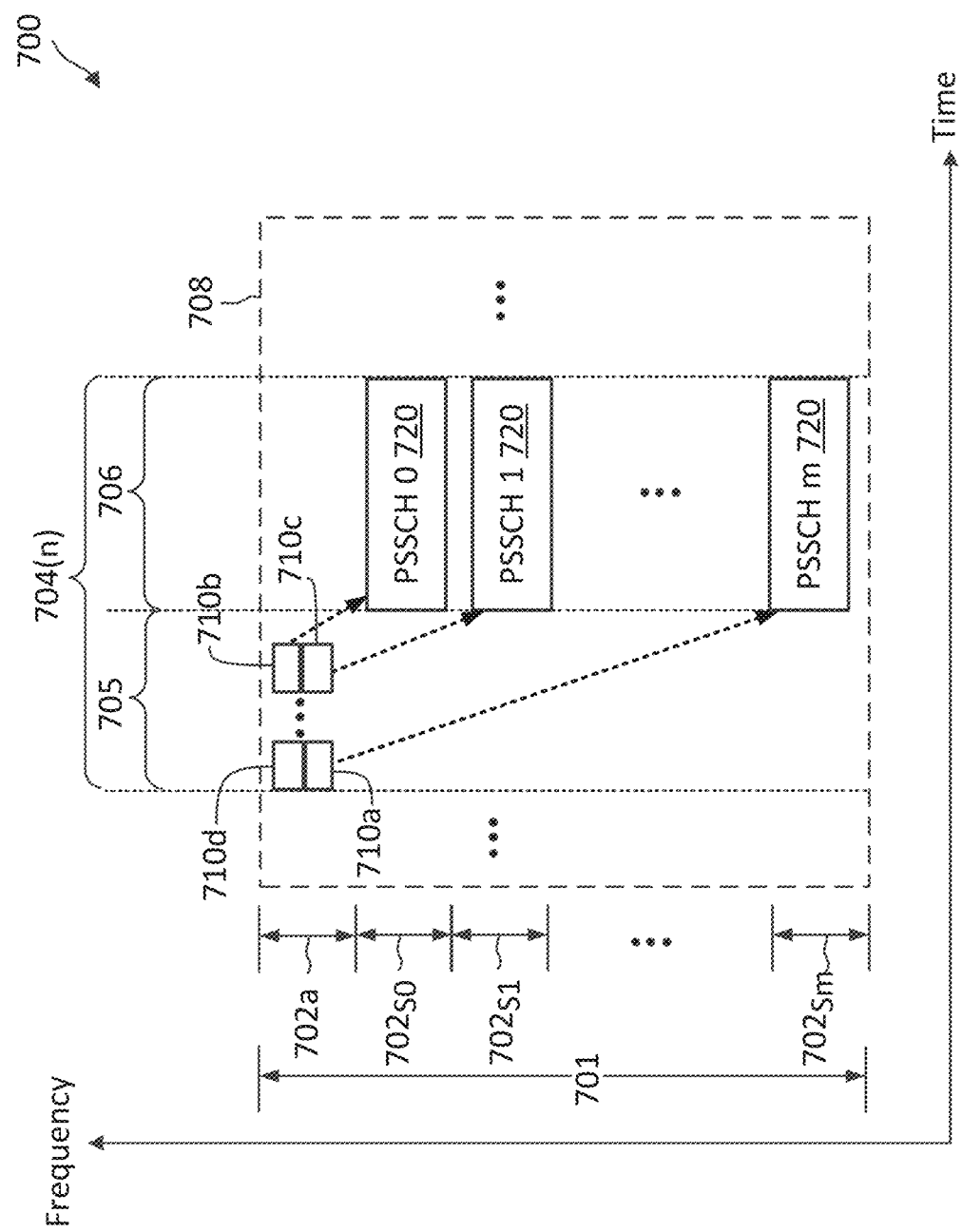
FIG. 7 illustrates a sidelink communication scheme with frequency-hopping based channel access according to some aspects of the present disclosure.

FIG. 7 illustrates a sidelink communication scheme 700 with frequency-hopping based channel access according to some aspects of the present disclosure. The scheme 700 may be employed by UEs such as the UEs 115, 215, and/or 500 in a network such as the networks 100 and/or 200. In particular, sidelink UEs may employ the scheme 700 to communicate sidelink over a shared radio frequency band (e.g., in a shared spectrum or an unlicensed spectrum). The shared radio frequency band may be shared by multiple RATs as discussed in FIG. 2. In FIG. 7, the x-axis represents time in some arbitrary units, and the y-axis represents frequency in some arbitrary units.

In the scheme 700, a shared radio frequency band 701 is partitioned into a plurality of subchannels or frequency subbands 702 (shown as 702a, $702_{S0}$, $702_{S1}$, ..., $702_{Sm}$) in frequency and partitioned into a plurality of sidelink frames 704 in time for sidelink communication. For simplicity of illustration and discussion, FIG. 7 illustrates one sidelink frame 704(n), where n may be any positive integer representing a frame index. The frequency band 701 may be at any suitable frequencies (e.g., at about 2.4 GHz, 5 GHz, or 6 GHz). The frequency band 701 may be substantially similar to the frequency bands 301 and 401. The frequency subbands 702 may be substantially similar to the frequency subbands 302 and 402. In some aspects, the frequency band 701 may be a 2.4 GHz unlicensed band with a BW of about 80 MHz and may be partitioned into about fifteen subbands 702 each having a BW of about 5 MHz.

A BS (e.g., the BSs 105 and/or 600) may configure a sidelink resource pool 708 in the frequency band 701. As discussed above, sidelink communications may rely on SCI sensing and decoding for scheduling information and sidelink resource reservations. To facilitate SCI sensing in a sidelink system with frequency hopping, the BS may configure one of the frequency subbands 702 in the frequency band 701 as an anchor channel for SCI communication. Thus, a sidelink UE (e.g., the UEs 115, 215, and/or 500) may monitor a single frequency subband 702 and instead of across different frequency subbands 702 at different time periods to decode SCI. To satisfy frequency-hoping, the BS may configure PSSCHs 720 in the remaining frequency subbands 702 and a sidelink UE may hop across the PSSCHs 720 for sidelink data communications.

In the illustrated example of FIG. 7, the BS configures an anchor channel in the frequency subband 702a for SCI communication and configures PSSCHs 720 in the frequency subbands $702_{s0}$ to $702_{Sm}$ for sidelink data communications with frequency-hopping. As shown, the sidelink frame 704(n) includes a portion 705 and a portion 706. The portion 705 includes a plurality of PSCCHs 710 multiplexed in time and frequency within the frequency subband 702a. The portion 706 includes a plurality of PSSCHs 720, each located within one of the frequency subbands $702_{S0}$ to $702_{Sm}$. In some instances, there can be a frequency gap or guard band between adjacent PSSCHs 720 as shown in FIG. 7, for example, to mitigate adjacent band interference.

The PSCCHs 710 are packed into a single frequency subband 702a or the anchor channel to facilitate SCI sensing as described in greater detail herein. For simplicity of illustration and discussion, FIG. 7 illustrates four PSCCHs 710a, 710b, 710c, and 710d in the frequency subband 702a in the portion 705. However, it should be understood that the frequency subband 702a may include any suitable number of PSCCHs 710 (e.g., 2, 3, 5, 6, 7 or more) in the portion 705. Each PSCCH 710 may be associated with one of the PSSCHs 720. Accordingly, the number of PSCCHs 710 may correspond to the number of the PSSCHs 720 in the frequency band 701. For instance, if the frequency band 701 includes fifteen subbands 702, the frequency band 701 may include one anchor channel and fourteen PSSCHs 720, where the anchor channel may include fourteen PSCCHs 710.

In some aspects, there is a one-to-one mapping between the PSCCHs 710 and the PSSCHs 720. The mapping or association between the PSCCHs 710 and PSSCH 720 may be predetermined. For instance, each PSCCH 710 in a sidelink frame 704 may be associated with one of the PSSCH 720s in the sidelink frame 704 based on a predetermined PSCCH-to-PSSCH mapping. In the illustrated example of FIG. 7, the PSCCH 710a is associated with the PSSCH m 720, the PSCCH 710b is associated with the PSSCH 0 720, and the PSCCH 710c is associated with the PSSCH 1 720 based on a predetermined mapping (shown by the dotted arrows). For instance, a sidelink UE may transmit SCI in the PSCCH 710a and sidelink data in the PSSCH m 720 in the sidelink frame 704(n) according to the predetermined mapping. In other words, the sidelink UE may identify an association between the PSCCH 710a and the PSSCH m 720 based on the predetermined mapping. Another sidelink UE may transmit SCI in the PSCCH 710b and sidelink data in the PSSCH 0 720 in the sidelink frame 704(n) according to the predetermined mapping. In other words, the other sidelink UE may identify an association between the PSCCH 710b and the PSSCH 0 720 based on the predetermined mapping.

In some aspects, the association between the PSCCHs 710 and PSSCH 720 may be indicated by SCI in the PSCCH 710. For instance, a sidelink UE may transmit SCI in a PSCCH 710a may include, in the SCI, a pointer pointing to a frequency location and/or a channel index of an associated PSSCH m 720. Accordingly, in some instances, a monitoring or received sidelink UE may identify an association between the SCI in the PSSCH 710a and the PSSCH m 720 based on the pointer in the SCI.

In NR sidelink, SCI may be transmitted in two stages, a stage-one SCI and a stage-two SCI. A stage-one SCI may include information related to channel sensing. For instance, the stage-one SCI may indicate resource reservations, for instance, time slots or time intervals and/or frequency subbchannels where the reserved resources are located and/or a periodicity of the reserved resource. The stage-one SCI can facilitate SCI sensing and intra-system collision avoidance. A stage-two SCI may include transmission parameters that are related to the transmission in a corresponding PSSCH 720. The stage-two SCI can facilitate sidelink data decoding. The PSCCHs 710 in the anchor channel may be used to carry stage-one SCI including sidelink channel reservation information in a sidelink frame 704 at a later time. For instance, a sidelink UE may transmit the stage-one SCI in the PSCCH 710a during the sidelink frame 704(n). The stage-one SCI may indicate a reservation for a PSCCH 710b and a corresponding PSSCH 0 720 in a sidelink frame 704(n+K), where K may be a positive integer greater than 1 as discussed in greater detail herein. As such, other UEs may perform SCI sensing and decoding in the anchor channel or frequency subband 702a to determine whether a PSCCH 710 and/or an associated PSSCH 720 is reserved in later sidelink frames 704 based on decoded SCI.

The sidelink UE may further determine which of the PSSCHs 720 to reserve in a later sidelink frame 704 based on a frequency hopping pattern. In some instances, the sidelink UE may receive the frequency-hopping pattern from the BS the BS may configure the sidelink UE with a certain frequency hopping pattern for sidelink data transmission and the sidelink UE may hop from one PSSCH 720 to another PSSCH 720 for sidelink data transmission across the sidelink frames 704 based on the frequency hopping pattern.

The sidelink UE may further determine when to transmit in the frequency band 701 based on a regulation parameter associated with the frequency band 701. As discussed above, regulations in a 2.4 GHz band allows a node to transmit without performing an LBT when the node applies frequency-hopping to transmissions and satisfies a transmission sequence or on/off pattern with a maximum transmission duration of about 5 ms and a silent or gap duration of about 5 ms between transmissions. Mechanisms for sidelink communications with frequency-hopping and satisfying a transmission sequence or on/off pattern are described below in FIG. 8.

Figure 8:
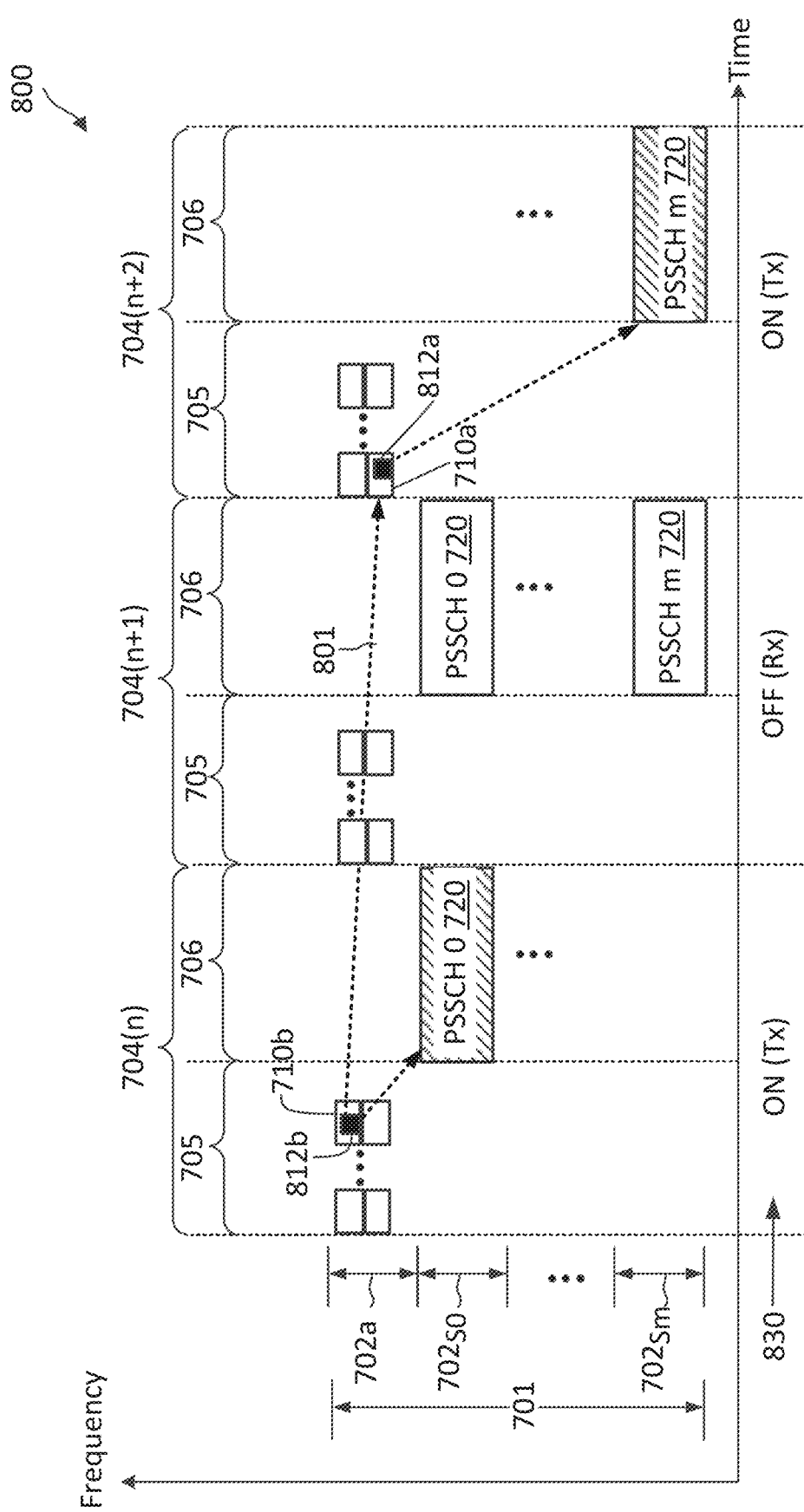
FIG. 8 illustrates a sidelink communication scheme with frequency-hopping based channel access according to some aspects of the present disclosure.

FIG. 8 illustrates a sidelink communication scheme 800 with frequency-hopping based channel access according to some aspects of the present disclosure. The scheme 800 may be employed by UEs such as the UEs 115, 215, and/or 500 in a network such as the networks 100 and/or 200. In particular, sidelink UEs may employ the scheme 800 to communicate sidelink over a shared radio frequency band (e.g., in a shared spectrum or an unlicensed spectrum). In FIG. 8, the x-axis represents time in some arbitrary units, and the y-axis represents frequency in some arbitrary units. FIG. 8 is described using a substantially similar PSCCH and PSSCH channel structure and PSCCH-to-PSSCH mapping as described in the scheme 700 and may use the same reference numerals as in FIG. 7 for simplicity's sake.

In the scheme 800, a BS (e.g., the BSs 105 and/or 600) may configure a sidelink UE (e.g., the UEs 115, 215, and/or 500) with a channel access configuration for communicating sidelink in the frequency band 701. In some other instances, the sidelink UE may be preconfigured with the channel access configuration based on a certain spectrum access regulation. The channel access configuration may indicate a transmission sequence having a maximum transmission duration (e.g. about 5 ms) and a minimum transmission gap (e.g., about 5 ms) between transmissions. In other words, the transmission sequence may have an on/off pattern with an active transmission duration followed by a transmission gap. The transmission sequence may be based on a regulation parameter in the frequency band 701. The BS may configure the duration of the sidelink frames 704 according to the transmission sequence (shown by the reference numeral 830). For instance, when the frequency band 701 is a 2.4 GHz unlicensed band, each sidelink frames 704 may have a duration of about 5 ms.

In the illustrated example of FIG. 8, in the sidelink frame 704(n), the sidelink UE transmits SCI 812b in the PSCCH 710b and transmits sidelink data in a corresponding PSSCH 0 720 (shown by the pattern-filled box), for example, based on a predetermined mapping as discussed above with reference to FIG. 7. The sidelink UE may utilize the next sidelink frame 704(n+1) as a transmission gap. In some aspects, the sidelink UE may switch to a receive mode during a next sidelink frame 704(n+1) to satisfy the transmission gap or the transmission on/off pattern. Mechanisms for receive mode operations are described in greater detail below in FIGS. 9 and 10.

After satisfying the transmission gap in the sidelink frame 704(n+1), the sidelink UE switches back to the transmit mode and attempt to transmit in the sidelink frame 704(n+2). As shown, the sidelink UE transmits SCI 812a in the PSCCH 710a and transmits sidelink data in a corresponding PSSCH m 720 (shown by the pattern-filled box), for example, based on a predetermined mapping. The sidelink UE may determine to transmit the SCI 812a in the PSCCH 710a based on a frequency-hopping pattern that includes hopping from the PSSCH 0 720 to the PSSCH m 720, for example, configured by the BS.

In some aspects, the sidelink UE may utilize a narrowband transmitter for transmission. For instance, when the frequency band 701 is a 2.4 GHz unlicensed band, the narrowband transmitter may have a signal transmission BW of about 5 MHz to satisfy the frequency-hopping requirement at 2.4 GHz. Thus, in the sidelink frame 704(n), the sidelink UE may configure a frontend (e.g., LO, mixers, and/or filters at the RF unit 514) of the sidelink UE to tune to the frequency subband 702a for transmitting the SCI 812b. The sidelink UE may subsequently configure the frontend to switch to the frequency subband $702_{S0}$ for transmitting the sidelink data in the PSSCH 0 720. Similarly, in the sidelink frame 704(n+2), the sidelink UE may configure the frontend to the frequency subband 702a for transmitting the SCI 812a. The sidelink UE may subsequently configure the frontend to switch to the frequency subband $702_{Sm}$ for transmitting the sidelink data in the PSSCH m 720. The configuration may include tuning a LO and/or mixer at the frontend to a center frequency of a corresponding frequency subband 702 and/or adjusting the passband of a filter at the frontend to the frequency band of the anchor channel.

In some aspects, the SCI 812b may be a stage-one SCI including a reservation for a PSCCH 710 in a next potential transmission interval (e.g., the sidelink frame 704(n+2) after a transmission gap in the sidelink frame 704(n+1)). For instance, the SCI 812b may indicate a reservation for the PSCCH 710a in the sidelink frame 704(n+2) as shown by the dotted arrow 801. Since the PSCCH 710a is associated with the PSSCH 0 720 based on the PSCCH-to-PSSCH mapping, thus the reservation for the PSCCH 710a also reserves the corresponding PSSCH 0 720. The hopping from the PSSCH 0 720 in the sidelink frame 704(n) to the PSSCH m 720 in the sidelink frame 704(n+1) may be based on the frequency-hopping pattern of the sidelink UE as discussed above.

In some aspects, the sidelink UE may indicate the frequency-hopping pattern in the SCI 812b and/or 812a. Other sidelink UEs may learn or predict the occupancy information based on the frequency-hopping pattern. For instance, the SCI 812b may include a frequency-hopping sequence indicating the frequency subbands $702_{S0}$, $702_{Sm}$, $702_{S1}$, and $702_{S5}$. In other words, the sidelink UE may transmit in the PSSCH 0 720 during a sidelink frame 704(n), transmit in the PSSCH m 720 during a sidelink frame 704(n+2), transmit in the PSSCH 1 720 during a sidelink frame 704(n+4), and transmit in the PSSCH 5 720 during a sidelink frame 704(n+6), where the sidelink frames 704(n+1), 704(n+3), and 704(n+5) function as transmission gaps. Thus, other UEs may recognize or predict the occupancy of the PSSCH 0 720, PSSCH m 720, PSSCH 1 720, and PSSCH 5 720 in the sidelink frames 704(n), 704(n+2), 704(n+4), and 704(n+6), respectively, based on the indicated frequency-hopping pattern. Thus, the other UEs may avoid reserving the same PSSCH 720 in the same sidelink frame 704 as the sidelink UE indicating the frequency-hopping pattern. As such, the inclusion of the frequency-hopping pattern in SCI can reduce intra-sidelink system collisions.

Figure 9:
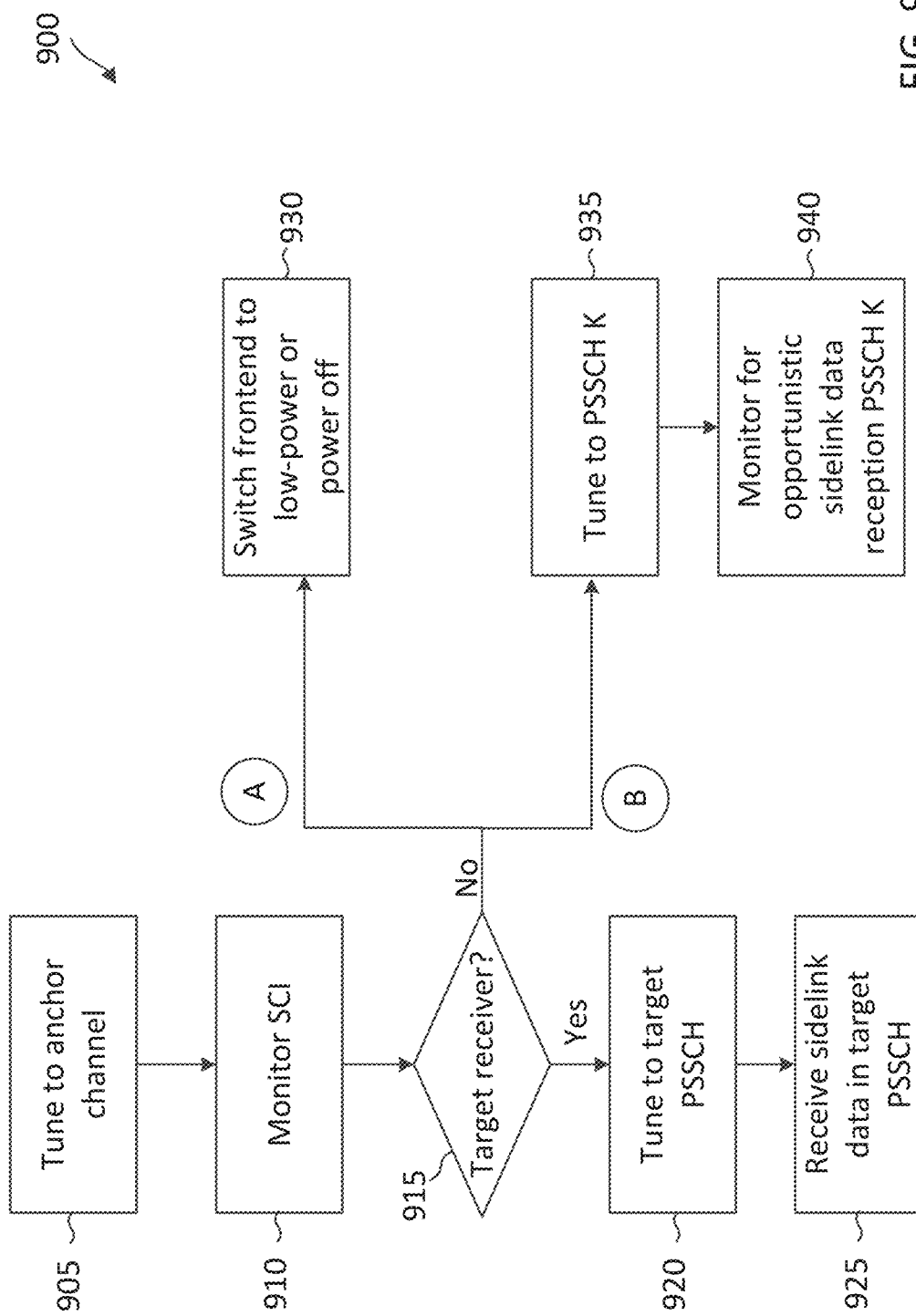
FIG. 9 is a flow diagram of a sidelink communication method according to some aspects of the present disclosure.

FIG. 9 is a flow diagram of a sidelink communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UEs 115, 215, and/or 500, may utilize one or more components, such as the processor 502, the memory 504, the sidelink communication module 508, the transceiver 510, the modem 512, and the one or more antennas 516, to execute the steps of method 900. As illustrated, the method 900 includes a number of enumerated steps, but aspects of the method 900 may include additional steps before, after, and in between the enumerated steps. In some aspects, one or more of the enumerated steps may be omitted or performed in a different order.

The method 900 may be employed in conjunction with the schemes 700 and/or 800. For instance, the method 900 may be implemented during a transmission gap or transmission off duration in the transmission sequence 830 discussed above with reference to FIG. 8.

At block 905, a sidelink UE A (e.g., the UEs 115, 215, and/or 500) tunes to an anchor channel carrying SCIs, for example, during a transmission gap (e.g., the sidelink frame 704(n+1) of FIG. 8). The anchor channel may correspond to the frequency subband 702a. In some instances, the sidelink UE A may be a narrowband communication device and may utilize one or more components, such as the processor 502, the sidelink communication module 508, and the transceiver 510, to configure a frontend such as the RF unit 514 to receive signals in the anchor channel. The configuration may include tuning a LO at the frontend to a center frequency of the anchor channel and/or configuring the passband of a filter at the frontend to the frequency band of the anchor channel.

At block 910, the sidelink UE A monitors for SCI in the anchor channel. For instance, the sidelink UE A may utilize one or more components, such as the processor 502, the sidelink communication module 508, the transceiver 510, the modem 512, and the one or more antennas 516, to receive a signal from the anchor channel during a time period (e.g., the portion 705) within the transmission gap where multiplexed PSCCHs (e.g., the PSCCHs 710) are located and perform blind decoding in each PSCCH.

At block 915, the sidelink UE A determines whether the sidelink UE A is a target receiver in the transmission gap. For instance, the sidelink UE A may utilize one or more components, such as the processor 502, the sidelink communication module 508, the transceiver 510, the modem 512, and the one or more antennas 516, to determine whether the sidelink UE A is a target receiver in the transmission gap by reading SCI decoded from the anchor channel and determining whether any of the decoded SCI indicates a destination ID matching an ID of the sidelink UE. As discussed above, a SCI may include a destination ID identifying a target receiver for sidelink data in a corresponding PSCCH (e.g., the PSSCHs 720). If a decoded SCI indicates that sidelink data in a corresponding PSSCH is destined for the sidelink UE, the sidelink UE A is a target receiver. If the sidelink UE A is a target receiver in the transmission gap, the sidelink UE A proceeds to the block 920.

At block 920, the sidelink UE A tunes to a target PSSCH (e.g., the PSSCH 720) corresponding to the decoded SCI indicating the sidelink UE A as the destination or target receiver. Referring to the example shown in FIG. 8, if the SCI indicating the sidelink UE A as the target receiver is detected from the PSCCH 710a, the sidelink UE A may tune to the PSSCH m 720, for example, based on a predetermined PSCCH-to-PSSCH mapping. Alternatively, the decoded SCI may include a frequency channel or location indicating the PSSCH associated with the decoded SCI. The sidelink UE A may tune the frontend to the target PSSCH using substantially similar mechanisms as in the block 905.

At block 925, after tuning to the target PSSCH, the sidelink UE A receives sidelink data in the target PSSCH. For instance, the sidelink UE A may utilize one or more components, such as the processor 502, the sidelink communication module 508, the transceiver 510, the modem 512, and the one or more antennas 516, to receive sidelink data in the target PSCCH.

Returning to block 915, if the sidelink UE A determines that the sidelink UE A is not a target receiver in the transmission gap, the sidelink UE A may have two options, an option A (shown by the circle with the letter A) and an option B (shown by the circle with the letter B). For option A, the sidelink UE A may proceed to block 930. At block 930, upon determining that the sidelink UE A is not a target receiver, the sidelink UE A may switch one or more components at a frontend of the sidelink UE A to a low-power mode or a power-off mode to save power. For instance, the sidelink UE A may utilize one or more components, such as the processor 502, the sidelink communication module 508, to switch the power modes of the one or more components to a low-power mode or a power-off mode.

Alternatively, for option B, the sidelink UE A may proceed to the block 935. At block 935, the sidelink UE A tunes to a PSSCH K (e.g., the PSSCH 720) for opportunistic sidelink reception. For instance, the sidelink UE A may include, in a previously transmitted SCI (e.g., the SCI 812b transmitted in the sidelink frame 704(n) before the transmission gap), an indication that the sidelink UE A may switch to monitor the PSSCH K for opportunistic sidelink data reception in the transmission gap when there is no sidelink data destined for the sidelink UE. Thus, another sidelink UE B (e.g., the UEs 115, 215, and/or 500) may opportunistically transmit sidelink data to the sidelink UE A in the PSSCH K during the transmission gap of the sidelink UE A. The sidelink UE A may tune to the PSSCH K using substantially similar mechanisms as in the block 905.

At block 940, after tuning to the PSSCH K, the sidelink UE A monitors for opportunistic sidelink data reception in the PSSCH K. For instance, the sidelink UE A may utilize one or more components, such as the processor 502, the sidelink communication module 508, the transceiver 510, the modem 512, and the one or more antennas 516, to receive a signal in the PSSCH K and decode the signal to determine whether the signal carries sidelink data destined for the sidelink UE A. For instance, if the received signal carries sidelink destined for the sidelink UE A, the sidelink UE A may successfully decode data from the received signal. Conversely, if the received signal does not carry sidelink destined for the sidelink UE A, the sidelink UE A may fail the decoding.

Figure 10A:
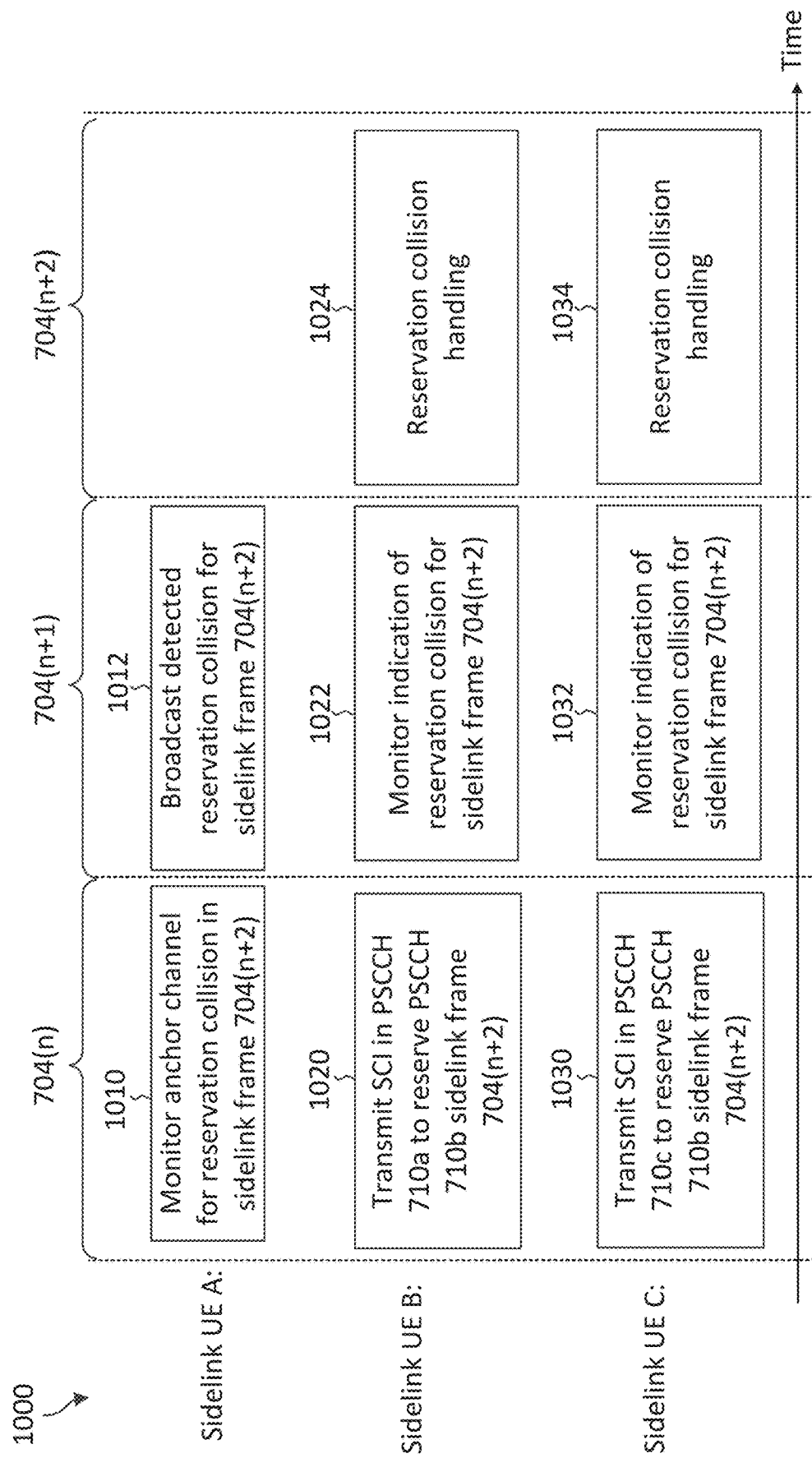
FIG. 10A illustrates a sidelink communication scheme with sidelink reservation collision detection according to some aspects of the present disclosure.

FIG. 10A illustrates a sidelink communication scheme 1000 with sidelink reservation collision detection according to some aspects of the present disclosure. The scheme 1000 may be employed by UEs such as the UEs 115, 215, and/or 500 in a network such as the networks 100 and/or 200. In particular, sidelink UEs may perform sidelink reservation detection as shown in the scheme 1000. In FIG. 10A, the x-axis represents time in some arbitrary units. FIG. 10A is described using a similar sidelink frame structure as in the scheme 700 and 800 and may use the same reference numerals as in FIGS. 7 and 8 for simplicity's sake. The scheme 1000 may be implemented in conjunction with the schemes 700 and/or 800 discussed above with reference to FIGS. 7 and 8 and/or the method 900 discussed above with reference to FIG. 9.

In the scheme 1000, a sidelink UE A (e.g., the sidelink UEs 115, 215, and/or 500) may monitor SCIs during a transmission gap, analyze decoded SCIs for collision detection, and broadcast reservation collision information upon detecting collisions among SCI reservations. For instance, the sidelink frame 704(n) may correspond to a transmission gap of the sidelink UE A and may correspond to a transmission on duration of a sidelink UE B (e.g., the sidelink UEs 115, 215, and/or 500) and a sidelink UE C (e.g., the sidelink UEs 115, 215, and/or 500). The sidelink frame 704(n+1) may correspond to a transmission on duration of the sidelink UE A and may correspond to a transmission gap of the sidelink UE B and the sidelink UE C. The sidelink frame 704(n+2) may correspond to a transmission gap of the sidelink UE A and may correspond to a transmission on duration of the sidelink UE B and the sidelink UE C. The operations of the sidelink UEs A, B, and C are discussed in relation to FIG. 8.

At block 1020, during the sidelink frame 704(n), the sidelink UE B transmits an SCI B (e.g., the SCIs 812) indicating a reservation for a PSCCH in a sidelink frame 704(n+2). For instance, the sidelink UE B may transmit the SCI B in the PSCCH 710a and the SCI B may reserve the PSCCH 710b and the corresponding PSSCH 0 720. In some instances, the sidelink UE B may utilize one or more components, such as the processor 502, the sidelink communication module 508, the transceiver 510, the modem 512, and the one or more antennas 516, to transmit the SCI B indicating the reservation for the PSCCH 710b and the corresponding PSSCH 0 720 in the sidelink frame 704(n+3).

At block 1030, during the sidelink frame 704(n), the sidelink UE C transmits an SCI C (e.g., the SCIs 812) indicating a reservation for a PSCCH in the same sidelink frame 704(n+2). For instance, the sidelink UE C may transmit the SCI C in the PSCCH 710c and the SCI C may reserve the same PSCCH 710b and the correspond PSSCH 0 720 as the sidelink UE B. In some instances, the sidelink UE C may utilize one or more components, such as the processor 502, the sidelink communication module 508, the transceiver 510, the modem 512, and the one or more antennas 516, to transmit the SCI C indicating the reservation for the PSCCH 710b and the corresponding PSSCH 0 720 in the sidelink frame 704(n+2).

At block 1010, during the sidelink frame 704(n), the sidelink UE A may monitor the anchor channel to identify SCI reservation collisions. In some instances, the sidelink UE A may utilize one or more components, such as the processor 502, the sidelink communication module 508, the transceiver 510, the modem 512, and the one or more antennas 516, to receive a signal from the anchor channel, perform blind decoding in each PSCCH, decode the SCI B transmitted by the sidelink UE B, decode the SCI C transmitted by the sidelink UE C, and determine that the SCI B and the SCI C reserves the same PSCCH 710b and the corresponding PSSCH 0 720 in the sidelink frame 704(n+2).

At block 1012, during the sidelink frame 704(n+1), upon detecting the reservation collision between the SCI B and the SCI C, the sidelink UE A broadcasts the detected reservation collision. For instance, the sidelink UE A may transmit a broadcast message indicating a reservation collision for PSCCH 710b and the corresponding PSSCH 0 720 in the sidelink frame 704(n+2). The broadcast message may be transmitted as an SCI in a PSCCH within the anchor channel. The broadcasting the detected reservation collision can inform UEs that transmitted the colliding SCI reservation to perform collision handling.

At block 1022, during the sidelink frame 704(n+1), the sidelink UE B monitors for an indication of reservation collision for the sidelink frame 704(n+2). In some instances, the sidelink UE B may utilize one or more components, such as the processor 502, the sidelink communication module 508, the transceiver 510, the modem 512, and the one or more antennas 516, to receive a signal from the anchor channel, perform blind decoding in each PSCCH, decode the SCI transmitted by the sidelink UE A indicating the reservation collision in the PSCCH 710b for the sidelink frame 704(n+2).

Similarly, at block 1032, during the sidelink frame 704(n+1), the sidelink UE C monitors for an indication of reservation collision for the sidelink frame 704(n+2). In some instances, the sidelink UE C may utilize one or more components, such as the processor 502, the sidelink communication module 508, the transceiver 510, the modem 512, and the one or more antennas 516, to receive a signal from the anchor channel, perform blind decoding in each PSCCH, decode the SCI transmitted by the sidelink UE A indicating the reservation collision in the PSCCH 710b for the sidelink frame 704(n+2).

At block 1024, during the sidelink frame 704(n+2), upon receiving the reservation collision indication for the PSCCH 710b in the sidelink frame 704(n+1), the sidelink UE B may determine that the collision from the reservation of the sidelink UE B (indicated in the previously transmitted SCI B), and thus may perform reservation collision handling as described below in FIG. 10B.

Similarly, at block 1034, during the sidelink frame 704(n+2), upon receiving the reservation collision indication for the PSCCH 710b in the sidelink frame 704(n+1), the sidelink UE C may determine that the collision from the reservation of the sidelink UE C (indicated in the previously transmitted SCI C), and thus may perform reservation collision handling as described below in FIG. 10B.

Figure 10B:
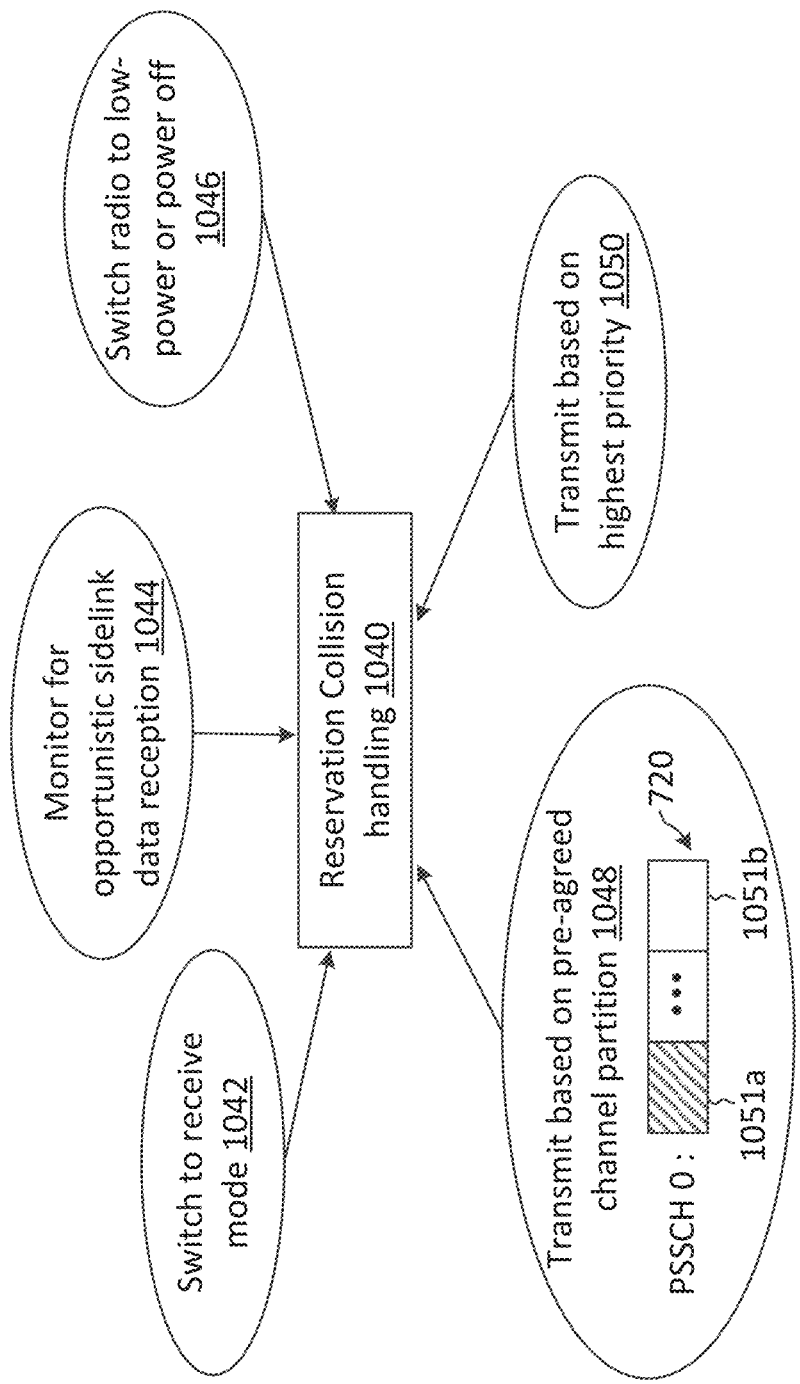
FIG. 10B illustrates a sidelink reservation collision handling scheme according to some aspects of the present disclosure.

FIG. 10B illustrates a sidelink reservation collision handling scheme 1040 according to some aspects of the present disclosure. The sidelink reservation collision handling scheme 1040 may be employed by UEs such as the UEs 115, 215, and/or 500 in a network such as the networks 100 and/or 200. In particular, a sidelink UE may implement the scheme 1040 upon when the sidelink UE causes a SCI reservation collision. For instance, the sidelink UE B and/or the sidelink UE C in FIG. 10A may implement the scheme 1040 at the block 1024 and the block 1034, respectively. The scheme 1040 is discussed in relation to FIG. 10A and may be described using the sidelink UE B for simplicity of discussion. However, the sidelink UE C may perform substantially similar operations as the sidelink UE B for reservation collision handling.

The scheme 1040 includes various options for sidelink reservation collision handling as discussed below with reference to blocks 1042, 1044, 1046, 1048, and/or 1050. In some aspects, the sidelink UE B that causes the sidelink reservation collision in the sidelink frame 704(n+3) may switch to a receive mode as shown in block 1042. For instance, the sidelink UE B may give up the reservation for the PSCCH 710b and the corresponding PSSCH 0 720 in the sidelink frame 704(n+2) and refrain from transmitting in the PSCCH 710b and the corresponding PSSCH 0 720. In some instances, the sidelink UE A may utilize one or more components, such as the processor 502, the sidelink communication module 508, the transceiver 510, the modem 512, and the one or more antennas 516, to switch to receive a signal from anchor channel, determine whether there is any sidelink data destined for the sidelink UE B.

In some aspects, the sidelink UE B that causes the sidelink reservation collision in the sidelink frame 704(n+2) may monitor for opportunistic data reception as shown in block 1044. The sidelink UE B may include, in a previously transmitted SCI, an indication that the sidelink UE B may monitor a particular PSSCH (e.g., the PSSCH m 720) upon detecting a reservation collision. Thus, another UE that has sidelink data for the sidelink UE B may transmit the sidelink data in the indicated PSSCH. The sidelink UE B may use substantially similar mechanisms as described in blocks 935 and 940 to monitor for opportunistic data reception.

In some aspects, the sidelink UE B that causes the sidelink reservation collision in the sidelink frame 704(n+2) may switch one or more frontend components at the sidelink UE B to a low-power mode or a power-off mode as shown in block 1046. The sidelink UE B may include, in a previously transmitted SCI, an indication that the sidelink UE B may switch the frontend to the low-power mode or power-off mode for power saving upon detecting a reservation collision. The sidelink UE B may use substantially similar mechanisms as described in blocks 930 to switch the frontend to the low-power mode or power off mode.

In some aspects, the sidelink UE B that causes the sidelink reservation collision in the sidelink frame 704(n+2) may transmit in the sidelink frame 704(n+2) based on a pre-agreed channel partition as shown in block 1048. The sidelink UE B may be configured with the pre-agreed channel partition configuration. For instance, the configuration may indicate that a PSSCH 0 720 can be partitioned into multiple portions 1051 (shown as 1051a, . . . , 1051b) upon a reservation collision and the sidelink UE B may use a particular portion (e.g., the patterned-filled portion 1051a) of the PSSCH 0 720. Thus, the sidelink UE B may transmit sidelink data in the portion 1051a and refrain from transmitting in the other portions 1051. In some instances, the sidelink UE A may utilize one or more components, such as the processor 502, the sidelink communication module 508, the transceiver 510, the modem 512, and the one or more antennas 516, to transmit sidelink data in the portion 1051a.

In some aspects, the sidelink UE B that causes the sidelink reservation collision in the sidelink frame 704(n+2) may transmit in the reserved PSSCH 0 720 during sidelink frame 704(n+2) irrespective of the reservation collision based on a data priority as shown in block 1050. For instance, the sidelink UE B may include a data priority when indicating a reservation. For example, the sidelink UE B may indicate, in the SCI B (transmitted at block 1020 of FIG. 10A), that the reservation for the PSCCH 710b and the corresponding PSSCH 0 720 in the sidelink frame 704(n+2) is for priority P1. Similarly, the sidelink UE may indicate, in the SCI C (transmitted at block 1030 of FIG. 10A), that the reservation for the PSCCH 710b and the corresponding PSSCH 0 720 in the sidelink frame 704(n+2) is for priority P2. The sidelink UE A may include, in the reservation collision indication (transmitted at block 1012 of FIG. 10A), the priorities P1 and P2 associated with the collision. If P1 is a highest priority among the collided reservations, the sidelink UE B may disregard the collision and proceed to transmit in the PSSCH 0 720 during the sidelink frame 704(n+2). If P1 is not a highest priority among the collided reservations, the sidelink UE B may refrain from transmitting in the PSSCH 0 720 during the sidelink frame 704(n+3).

In some aspects, the sidelink UE B may be configured to utilize a particular collision handling option shown in the blocks 1042, 1044, 1046, 1048, and/or 1050. In some aspects, the sidelink UE B may be configured with a reservation collision rule and may select one of the actions shown in the blocks 1042, 1044, 1046, 1048, and/or 1050 based on the reservation collision rule.

Figure 11:
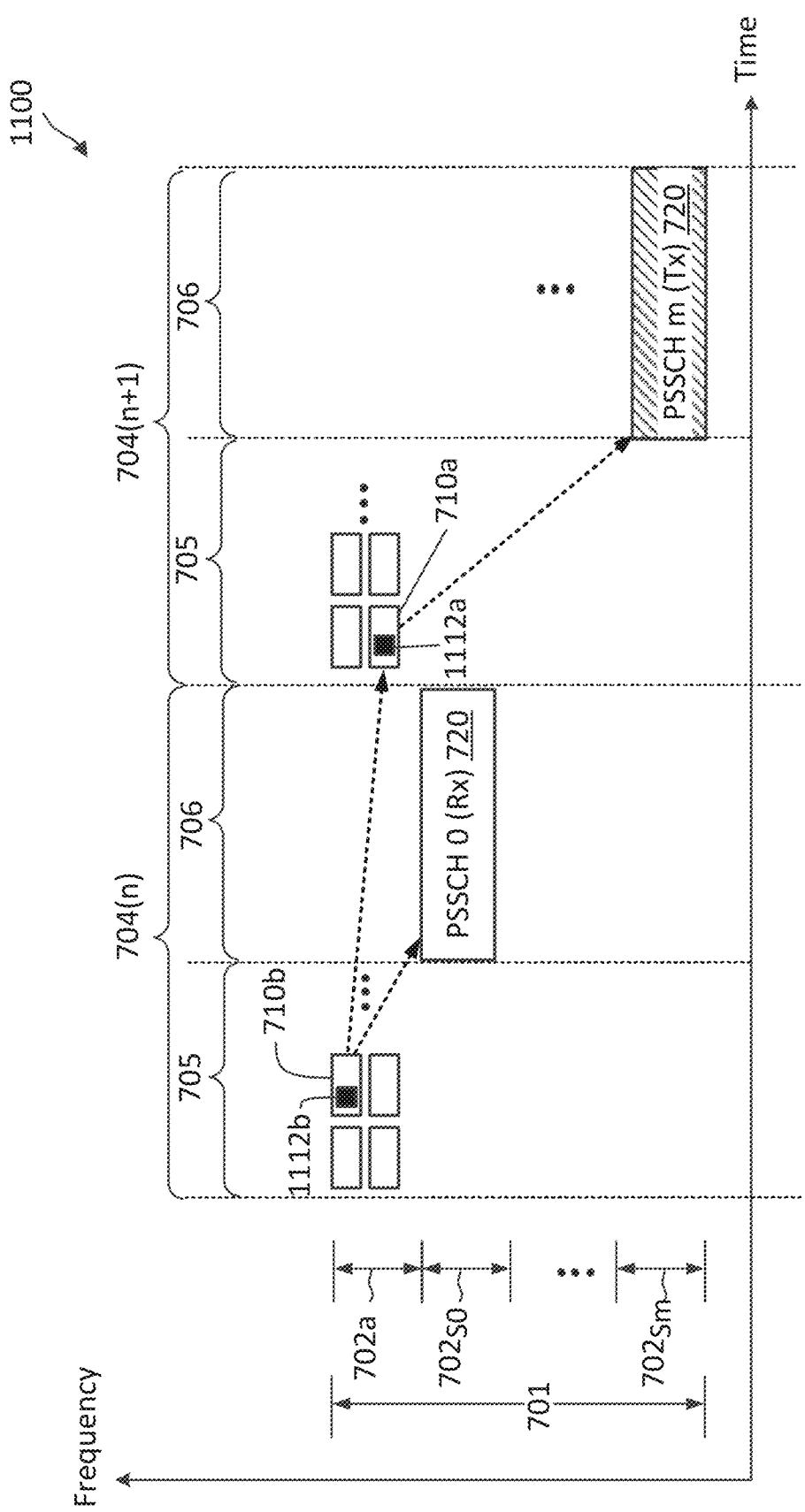
FIG. 11 illustrates a sidelink communication scheme with frequency-hopping based channel access according to some aspects of the present disclosure.

FIG. 11 illustrates a sidelink communication scheme 1100 with frequency-hopping based channel access according to some aspects of the present disclosure. The scheme 1100 may be employed by UEs such as the UEs 115, 215, and/or 500 in a network such as the networks 100 and/or 200. In particular, sidelink UEs may employ the scheme 1100 to communicate sidelink over a shared radio frequency band (e.g., in a shared spectrum or an unlicensed spectrum). In FIG. 11, the x-axis represents time in some arbitrary units, and the y-axis represents frequency in some arbitrary units. FIG. 11 is described using a substantially similar PSCCH and PSSCH channel structure and PSCCH-to-PSSCH mapping as described in the schemes 700 and 800 and may use the same reference numerals as in FIGS. 7 and 8 for simplicity's sake.

In the scheme 1100, a sidelink UE A (e.g., the UEs 115, 215, and/or 500) may transmit SCI to occupy a PSSCH as a receiver. As shown, during the sidelink frame 704(n), the sidelink UE A may transmit SCI 1112b in the PSCCH 710b. The SCI 1112b may indicate a receive schedule for the PSSCH 0 720 and a transmitter ID. A sidelink UE B corresponding to the transmitter ID may transmit sidelink data to the sidelink UE A in the PSSCH 0 720 in the sidelink frame 704(n) according to the receive schedule. In some instances, the sidelink frame 704(n) may not be a transmission gap of the sidelink UE A.

In some aspects, the sidelink UE A may include a reservation in the next sidelink frame 704(n+1) in the SCI 1112b. For instance, the reservation may reserve the PSCCH 710a and the corresponding PSSCH m 720 in the sidelink frame 704(n+K+1) for transmission. In the sidelink frame 704(n+1), the sidelink UE A may transmit SCI 1112a in the PSCCH 710a and transmit sidelink data in the PSSCH m 720 corresponding to the PSCCH 710a. The sidelink UE A may transmit the SCI 1112b and the SCI 1112a in consecutive sidelink frames 704(n) and 704(n+1) without failing the channel access requirement or the transmission sequence requirement in the frequency band 701 since the sidelink UE A is in a sidelink data reception mode during the sidelink frame 704(n). In some instances, sidelink UE A may receive sidelink data in the PSSCH 0 720 (shown as PSSCH 0 (Rx)) during the sidelink frame 704(n) and may transmit a HARQ ACK/NACK feedback in the PSSCH m 720 (shown as PSSCH m (Tx)) during the sidelink frame 704(n+1).

In some aspects, a sidelink system may utilize a CBR and/or a CR to control when a sidelink UE may occupy a channel and how often the sidelink UE may occupy the channel, for example, for intra-system collision control. A CBR is a metric indicating a number of subchannels (e.g., the frequency subbands 702) in a sidelink resource pool (e.g., the resource pool 708) with a measured receive signal strength indicator (RSSI) greater than a preconfigured threshold divided by the total number of subchannels in the resource pool. The CBR metric can be computed for a certain number of time intervals or subframes (e.g., the sidelink frames 704). The CBR can provide an estimation on the total state of the channel. In some instances, a sidelink UE may compute a CBR by measuring RSSI in the subchannels within the resource pool over a time interval including a number of subframes (e.g., about 100), counting the number of subchannels with an RSSI above the preconfigured threshold in the time interval (e.g., a subchannel count), and dividing the subchannel count by the total number of subchannels in the resource pool.

A CR is a metric indicating a number of subchannels (e.g., the frequency subbands 702) occupied by a sidelink UE for transmission divided by a total number of subbchannels in the resource pool. The CR metric can be computed for a certain number of time intervals or subframes (e.g., the sidelink frames 704). The CR can provide an indication of channel utilization by the sidelink UE. In some instances, a sidelink UE may compute a CR by counting a number of subchannels in the resource pool where the sidelink UE has an active transmission (e.g., a subchannel count) over a time interval and dividing the subchannel count by the total number of subchannels in the resource pool.

In some aspects, the transmission of a receiver-originated SCI (e.g., the SCI 1112a) can be under a stricter control than the transmission of a transmitter-originated SCI (e.g., the SCI 1112a). For instance, for a certain CBR value, the sidelink UE A may be allowed to transmit a transmitter-originated SCI, but may not be allowed to transmit a receiver-originated SCI. In some other instances, the sidelink UE A may be configured with a table with entries indicating a CR for transmitter-originated SCI transmissions and a separate CR for receiver-originated SCI transmissions for each CBR. The CR for transmitter-originated SCI transmissions can be higher than the CR for receiver-originated SCI transmissions. For example, the CR for transmitter-originated SCI transmissions may be about 8 percent (%) while the CR for transmitter-originated SCI transmissions may be about 2%. In other words, a sidelink UE may have more opportunities for transmitting transmitter-originated SCI than for transmitting receiver-originated SCI.

Figure 12:
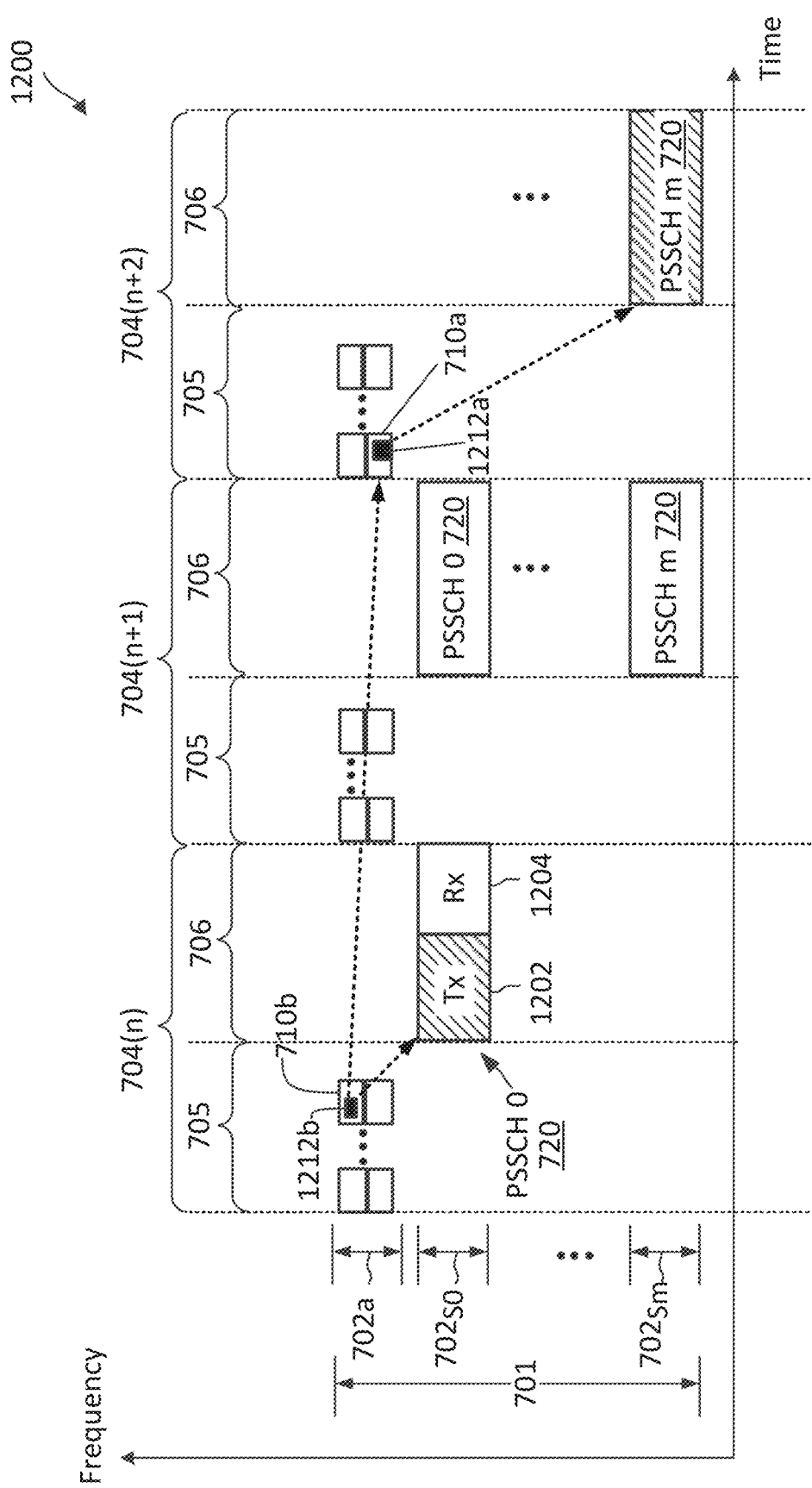
FIG. 12 illustrates a sidelink communication scheme with frequency-hopping based channel access according to some aspects of the present disclosure.

FIG. 12 illustrates a sidelink communication scheme 1200 with frequency-hopping based channel access according to some aspects of the present disclosure. The scheme 1200 may be employed by UEs such as the UEs 115, 215, and/or 500 in a network such as the networks 100 and/or 200. In particular, sidelink UEs may employ the scheme 1200 to communicate sidelink over a shared radio frequency band (e.g., in a shared spectrum or an unlicensed spectrum). In FIG. 12, the x-axis represents time in some arbitrary units, and the y-axis represents frequency in some arbitrary units. FIG. 12 is described using a substantially similar PSCCH and PSSCH channel structure and PSCCH-to-PSSCH mapping as described in the schemes 700 and 800 and may use the same reference numerals as in FIGS. 7 and 8 for simplicity's sake. The scheme 1200 may be implemented in conjunction with the schemes 700, 800, 1000, and/or 1100 discussed above with reference to FIGS. 7, 8, 10, and/or 11 respectively, and/or the method 900 discussed above with reference to FIG. 9.

In the scheme 1200, a sidelink UE A (e.g., the UEs 115, 215, and/or 500) may transmit SCI to occupy a PSSCH as a transmitter during a time interval or portion and as a receiver during another time interval within a sidelink frame 704. As shown, during the sidelink frame 704(n), the sidelink UE A transmits SCI 1212b in the PSCCH 710b indicating a transmit (Tx) portion 1202 and a receive (Rx) portion 1204 in the corresponding PSSCH 0 720a. The sidelink UE A may transmit sidelink data in the portion 1202 and receive sidelink data in the portion 1204. In some instances, the sidelink UE A may communicate with the same sidelink UE for the transmission and reception in the PSSCH 0 720. In some other instances, the sidelink UE A may communicate with different sidelink UEs for the transmission and reception in the PSSCH 0 720.

The sidelink UE A may utilize the next sidelink frame 704(n+1) as a transmission gap. After the transmission gap, the sidelink UE A may transmit SCI 1212a in the PSCCH 710a and sidelink data in the corresponding PSSCH m 720 during the sidelink frame 704(n+2). The sidelink UE A may implement the method 900 and/or the schemes 1000 during the transmission gap.

Figure 13:
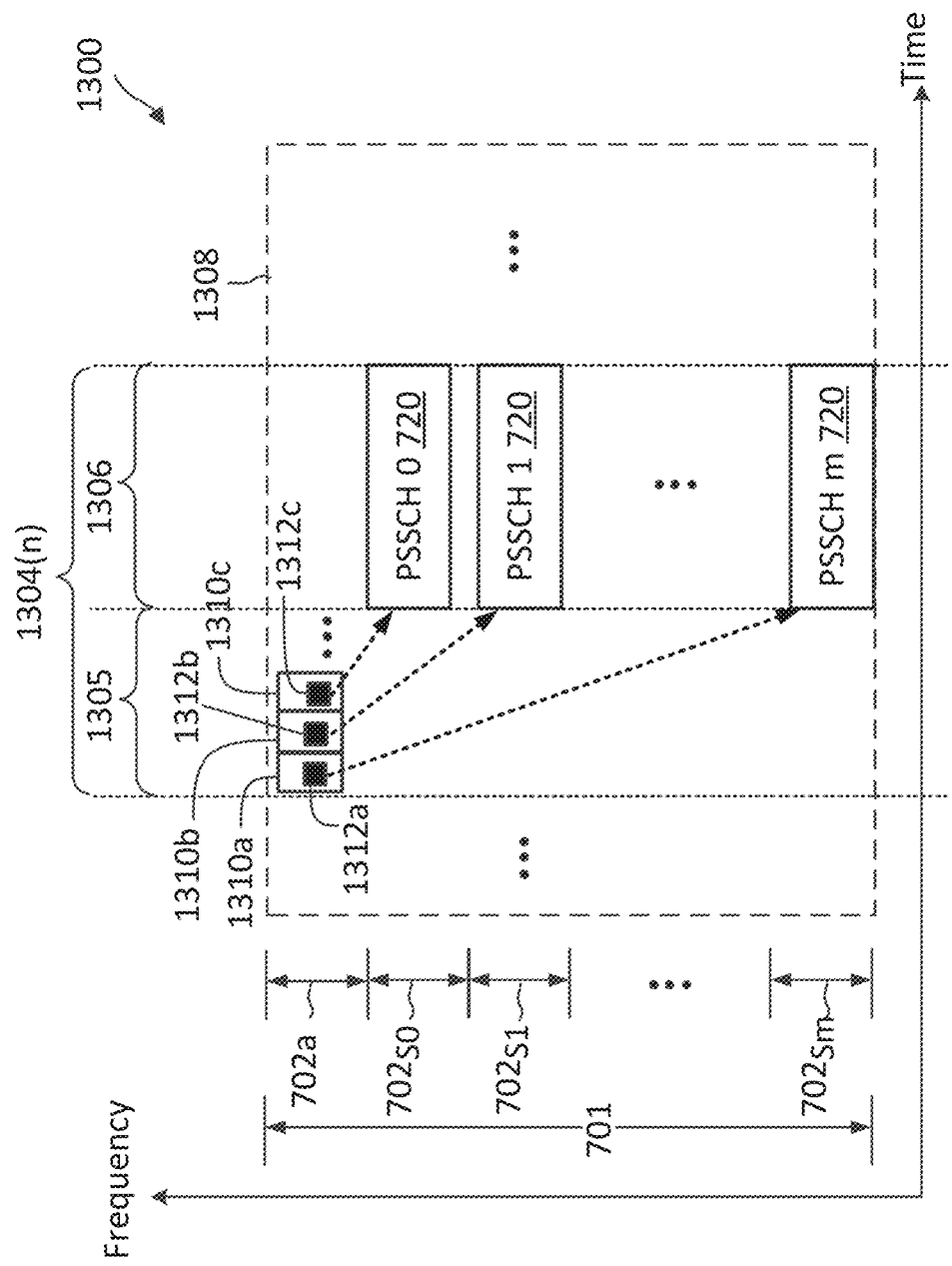
FIG. 13 illustrates a sidelink communication scheme with frequency-hopping based channel access according to some aspects of the present disclosure.

FIG. 13 illustrates a sidelink communication scheme 1300 with frequency-hopping based channel access according to some aspects of the present disclosure. The scheme 1300 may be employed by UEs such as the UEs 115, 215, and/or 500 in a network such as the networks 100 and/or 200. In particular, sidelink UEs may employ the scheme 1200 to communicate sidelink over a shared radio frequency band (e.g., in a shared spectrum or an unlicensed spectrum). In FIG. 13, the x-axis represents time in some arbitrary units, and the y-axis represents frequency in some arbitrary units. The scheme 1300 utilizes a substantially similar anchor channel and PSSCH channel partition structure as in the scheme 700 and may use the same reference numerals as in FIG. 7 for simplicity's sake. However, PSCCHs are multiplexed in time within the anchor channel and may not have a predetermined PSCCH-to-PSSCH mapping as in the scheme 700.

A BS (e.g., the BSs 105 and/or 600) may configure a sidelink resource pool 1308 in the frequency band 701. The BS may configure an anchor channel in the frequency subband 702a for SCI communication and may configure PSSCHs 720 in the remaining frequency subbands $702_{S0}$ to $702_{Sm}$. The BS may time-partition the resource pool 1308 into sidelink frames 1304 similar to the sidelink frames 704. The BS may configure multiple PSCCHs 1310 in the anchor channel within a portion 1305 of the sidelink frame 1304 via TDM. In some instances, the PSCCHs 1310 may be spaced apart from each other by a time gap, for example, to allow time for SCI decoding. In some other instances, the PSCCHs 1310 can be contiguous in time. For simplicity of illustration and discussion, FIG. 13 illustrates three PSCCHs 1310a, 1310b, and 1310c in the frequency subband 702a in the portion 1305. However, it should be understood that the frequency subband 702a may include any suitable number of PSCCHs 1310 (e.g., 2, 4, 5, 6, 7 or more) in the portion 1305.

A sidelink UE (e.g., the UEs 115, 215, and/or 500) may randomly select a PSCCH 1310 for SCI transmission. In the illustrated example of FIG. 13, a sidelink UE A selects the PSSCH m 720 for sidelink data communication (in a portion 1306 of the sidelink frame 1304) and transmits SCI 1312a in the PSCCH 1310a. The SCI 1312a may include an indication (e.g., a frequency location or channel index) of the PSSCH m 720. A sidelink UE B selects the PSSCH 1 720 for sidelink data communication and transmits SCI 1312b in the PSCCH 1310b. The SCI 1312b may include an indication (e.g., a frequency location or channel index) of the PSSCH 1 720. A sidelink UE C selects the PSSCH 0 720 for sidelink data communication and transmits SCI 1312c in the PSCCH 1310c. The SCI 1312c may include an indication (e.g., a frequency location or channel index) of the PSSCH 0 720.

In some aspects, to avoid collision, a sidelink UE may perform an LBT (e.g., SCI sensing and decoding) in preceding PSCCH(s) 1310 within a sidelink frame 1304 prior to transmitting an SCI in a PSCCH 1310. For instance, the sidelink UE B may perform an LBT in the PSCCH 1310a. The sidelink UE B may detect the SCI 1312a and may determine that the PSSCH m 720 is reserved based on the indication in the decoded SCI 1312a. Thus, the sidelink UE B may select a PSSCH 720 (e.g., the PSSCH 1 720) different from the PSSCH m 720 for sidelink communication. Similarly, the sidelink UE C may perform an LBT in the PSCCHs 1310a and 1312b. The sidelink UE C may detect the SCI 1312a in the PSCCH 1310a and may determine that the PSSCH m 720 is reserved based on the indication in the decoded SCI 1312a. Additionally, the sidelink UE C may detect the SCI 1312b in the PSCCH 1310b and may determine that the PSSCH 1 720 is reserved based on the indication in the decoded SCI 1312b. Thus, the sidelink UE C may select a PSSCH 720 (e.g., the PSSCH 0 720) different from the PSSCH m 720 and the PSSCH 1 720 for sidelink communication. In some aspects, a sidelink UE may determine whether to perform an LBT and/or SCI sensing/decoding based on whether there is a sufficient amount of time for LBT and/or SCI sensing prior to the SCI transmission.

In some aspects, the scheme 1300 can be used in conjunction with scheme 800, where frequency-hopping can be applied to sidelink data transmissions and the transmissions can be spaced apart by transmission gaps to satisfy a certain channel access requirement in the frequency band 701. For instance, the frequency band 701 may be a 2.4 GHz unlicensed band and each sidelink frame 1304 may have a duration of about 5 ms. A sidelink UE may be allowed to transmit in a sidelink frame 1304(n), stay silence in a next sidelink frame 1304(n+1), and transmit in a next sidelink frame 1304(n+2). In some aspects, the scheme 1300 can be used in conjunction with the method 900, where a sidelink UE may perform receiving operations during a transmission gap. In some aspects, the scheme 1300 can be used in conjunction with the schemes 1000 and 1040, where a sidelink UE may perform SCI collision detection and/or collision handling. In some aspects, the scheme 1300 can be used in conjunction with the scheme 1100, where a sidelink UE may transmit SCI in consecutive sidelink frames 1304 and may occupy a PSSCH 720 as a receiver. In some aspects, the scheme 1300 can be used in conjunction with the scheme 1200, where a sidelink UE may occupancy a portion of a PSSCH 720 as a transmitter and occupy another portion of the PSSCH 720 as a receiver. In general, sidelink UEs may implement the scheme 1300 in conjunction with any suitable combination of the schemes 800, 1000, 1040, 1100, 1200 and/or the method 900.

Figure 14:
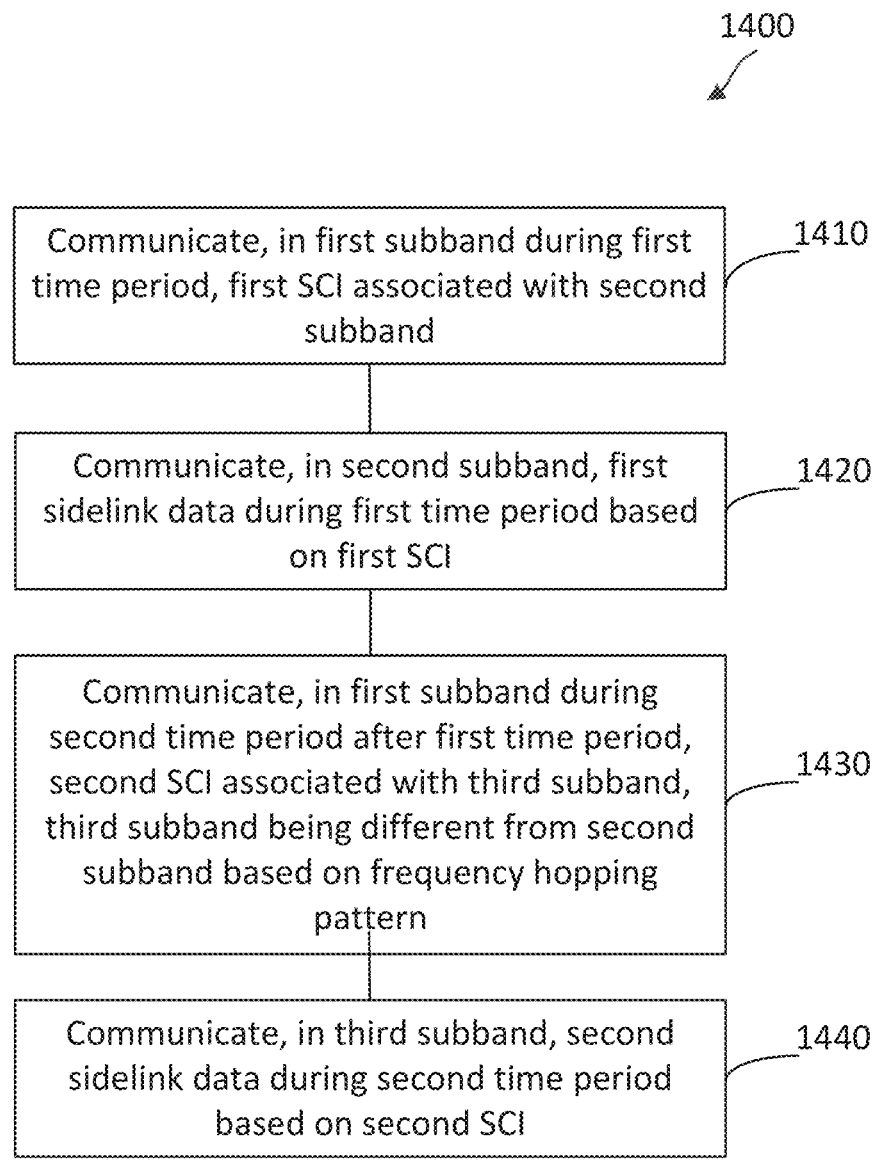
FIG. 14 is a flow diagram of a sidelink communication method according to some aspects of the present disclosure.

FIG. 14 is a flow diagram of a sidelink communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the UEs 115, 215, and/or 500, may utilize one or more components, such as the processor 502, the memory 504, the sidelink communication module 508, the transceiver 510, the modem 512, and the one or more antennas 516, to execute the steps of method 1400. The method 1400 may employ similar mechanisms as in the schemes 700, 800, 1000, 1040, 1100, and/or 1200 discussed above with respect to FIGS. 4, 7, 8, 10A, 10B, 11, and/or 12, respectively and/or the method 900 discussed above with respect to FIG. 9. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a first UE communicates, with a second UE in a first subband of a plurality of subbands within a shared radio frequency band during a first time period, where the first SCI associated with a second subband of the plurality of subbands. In some instances, the shared radio frequency band may be similar to the frequency band 701 and the subbands may be similar to the frequency subbands 702. The first time period may be similar to the sidelink frames 704 and/or 1304. The first SCI may be similar to the SCI 812, 1112, 1212, and/or 1312. In some instances, the first UE may utilize one or more components, such as the processor 502, the sidelink communication module 508, the transceiver 510, the modem 512, and the one or more antennas 516, to communicate the first SCI.

At block 1420, the first UE communicates, with the second UE, first sidelink data in the second subband during the first time period based on the first SCI. In some instances, the first UE may utilize one or more components, such as the processor 502, the sidelink communication module 508, the transceiver 510, the modem 512, and the one or more antennas 516, to communicate the first sidelink data.

At block 1430, the first UE communicates, with the second UE in the first subband during a second time period after the first time period, second SCI associated with a third subband of the plurality of subbands, where the third subband is different from the second subband based on a frequency hopping pattern. The second time period may be similar to the sidelink frames 704 and/or 1304. In some instances, the first UE may utilize one or more components, such as the processor 502, the sidelink communication module 508, the transceiver 510, the modem 512, and the one or more antennas 516, communicate the second SCI.

At block 1440, the first UE communicates, with the second UE, second sidelink data in the third subband during the second time period based on the second SCI. In some instances, the first UE may utilize one or more components, such as the processor 502, the sidelink communication module 508, the transceiver 510, the modem 512, and the one or more antennas 516, to communicate the second sidelink data.

In some aspects, the first subband includes a plurality of PSSCHs (e.g., the PSSCHs 720 and/or 1310) multiplexed in at least one of time or frequency in a first portion (e.g., the portions 705 and/or 1305) of the first time period. The first UE may communicate the first SCI at block 1410 in a first PSCCH of the plurality of PSCCHs. The first UE may communicate the first sidelink data at block 1420 in the second subband during a second portion (e.g., the portions 706 and/or 1306) of the first time period after the first portion. In some aspects, the first UE may communicate the first SCI in the first PSSCH based on a predetermined mapping between the first PSCCH and the second subband. In some aspects, the plurality of PSCCHs are multiplexed in time and the first UE may communicate the first SCI at block 1410 in the first PSCCH is based on an LBT in the first subband.

In some aspects, the first SCI discussed with reference to block 1410 may indicate a reservation for the third subband in the second time period based on the frequency hopping pattern. In some aspects, the first SCI discussed with reference to block 1410 may the frequency hopping pattern.

In some aspects, the first UE may communicate the first SCI at block 1410 by transmitting, to the second UE in the first subband, the first SCI during the first time period. The first UE may communicate the first sidelink data at block 1420 by transmitting, to the second UE in the second subband, the first sidelink data during the first time period. The first UE may communicate the second SCI at block 1430 by transmitting, to the second UE in the first subband, the second SCI during the second time period. The first UE may communicate the second sidelink data at block 1440 by transmitting, to the second UE in the third subband, the second sidelink data during the second time period. In some aspects, the first UE may monitor for SCI during a third time period between the first time period and the second time period. In some aspects, the first UE may operate in a receiving mode to receive sidelink data during the third time period as discussed above in the method 900 with reference to FIG. 9. In some aspects, the first UE may operate in a receiving mode during the third time period to analyze reservation collision and may broadcast reservation collision information in a next time period as discussed above in the scheme 1000 with reference to FIG. 10A.

In some aspects, the first UE may communicate the first SCI at block 1410 by receiving, from the second UE in the first subband, the first SCI during the first time period. The first UE may communicate the first sidelink data at block 1420 by receiving, from the second UE in the second subband, the first sidelink data during the first time period. The first UE may communicate the second SCI at block 1430 by receiving, from the second UE in the first subband, the second SCI during the second time period. The first UE may communicate the second sidelink data at block 1440 by receiving, from the second UE in the third subband, the second sidelink data during the second time period.

Further aspects of the present disclosure include a method of wireless communication. The method of wireless communication includes communicating, by a first user equipment (UE) with a second UE in a first subband of a plurality of subbands within a shared radio frequency band during a first time period, first sidelink control information (SCI) associated with a second subband of the plurality of subbands. The method of wireless communication also includes communicating, by the first UE with the second UE, first sidelink data in the second subband during the first time period based on the first SCI. The method of wireless communication also includes communicating, by the first UE with the second UE in the first subband during a second time period after the first time period, second SCI associated with a third subband of the plurality of subbands, the third subband being different from the second subband based on a frequency hopping pattern. The method of wireless communication also includes communicating, by the first UE with the second UE, second sidelink data in the third subband during the second time period based on the second SCI.

The method may also include one or more of the following features. For instance, the method may include where the first subband includes a plurality of physical sidelink control channels (PSCCHs) multiplexed in at least one of time or frequency in a first portion of the first time period; the communicating the first SCI includes communicating, by the first UE with the second UE, the first SCI in a first PSCCH of the plurality of PSCCHs; and the communicating the first sidelink data includes communicating, by the first UE with the second UE, the first sidelink data in the second subband during a second portion of the first time period after the first portion. The communicating the first SCI in the first PSCCH is based on a predetermined mapping between the first PSCCH and the second subband. The plurality of PSCCHs are multiplexed in time, and where the communicating the first SCI in the first PSCCH is based on a listen-before-talk (LBT) in the first subband. The first SCI indicates a reservation for the third subband in the second time period based on the frequency hopping pattern. The first SCI indicates the frequency hopping pattern. The communicating the first SCI includes transmitting, by the first UE to the second UE in the first subband, the first SCI during the first time period; the communicating the first sidelink data includes transmitting, by the first UE to the second UE in the second subband, the first sidelink data during the first time period; the communicating the second SCI includes transmitting, by the first UE to the second UE in the first subband, the second SCI during the second time period; and the communicating the second sidelink data includes transmitting, by the first UE to the second UE in the third subband, the second sidelink data during the second time period. The method may include monitoring, by the first UE in the first subband, for third SCI during a third time period between the first time period and the second time period. The monitoring includes receiving, by the first UE from a third UE, the third SCI indicating third sidelink data destined for the first UE in a fourth subband of the plurality of subbands. The method may include switching, by the first UE, a frontend component of the first UE to at least one of a low-power mode or a power-off mode in response to determining, from the monitoring, that there is no sidelink data destined for the first UE during the third time period. The first SCI indicates the at least one of the low-power mode or the power-off mode in the third time period when there is no sidelink data destined for the first UE during the third time period. The first SCI indicates a fourth subband of the plurality of subbands associated with opportunistic data reception in the third time period when there is no sidelink data destined for the first UE during the third time period; and the method further includes monitoring, by the first UE, for third sidelink data in the fourth subband during the third time period in response to determining, from the monitoring, that there is no sidelink data destined for the first UE in the third time period. The method may include monitoring, by the first UE, for one or more SCI in the first subband during a third time period between the first time period and the second time period; determining, by the first UE based on the monitoring, that at least two SCI are each reserving a fourth subband of the plurality of subbands in a fourth time period after the second time period; and transmitting, by the first UE, an indication of a reservation collision for the fourth subband based on the determining. The second SCI further indicates a reservation for a fourth subband of the plurality of subbands during a third time period, the fourth subband being different from the first subband; and the method further includes receiving, by the first UE during a fourth time period between the second time period and the third time period, an indication of a reservation collision for the fourth subband in the third time period. The method may include refraining, by the first UE in response to the reservation collision, from transmitting in the fourth subband during the third time period. The method may include transmitting, by the first UE, third sidelink data in the fourth subband during the third time period irrespective of the reservation collision based a priority of the third sidelink data. The method may include transmitting, by the first UE, third sidelink data in the fourth subband during a portion of the third time period based on a reservation collision rule in response to the reservation collision. The method may include switching, by the first UE, a frontend component of the first UE to at least one of a low-power mode or a power-off mode in the third time period in response to the reservation collision. The second SCI indicates the at least one of the low-power mode or the power-off mode in the third time period upon a detection of the reservation collision. The second SCI indicates a fifth subband of the plurality of subbands associated with opportunistic data reception in the third time period upon a detection of the reservation collision; and the method further includes monitoring, by the first UE, for third sidelink data in the fifth subband during the third time period in response to the reservation collision. The method may include transmitting, by the first UE in the first subband, third SCI during a third time period adjacent to the first time period, the third SCI indicating a fourth subband of the plurality of subbands for receiving third sidelink data and a reservation for the second subband in the first time period; and receiving, by the first UE in the fourth subband, the third sidelink data based on the third SCI. The transmitting the third SCI is based on at least one of a channel busy ratio (CBR) or a channel access occupancy ratio (CR). The first SCI indicates that the second subband is for transmission during a first portion of the first time period and for reception during a second portion of the first time period, the communicating the first sidelink data includes transmitting, by the first UE to the second UE in the second subband, the first sidelink data during the first portion of the first time period; and the method further includes receiving, by the first UE in the second subband, third sidelink data during the second portion of the first time period.

Further aspects of the present disclosure include a first user equipment (UE) including a transceiver configured to communicate, with a second UE in a first subband of a plurality of subbands within a shared radio frequency band during a first time period, first sidelink control information (SCI) associated with a second subband of the plurality of subbands; communicate, with the second UE, first sidelink data in the second subband during the first time period based on the first SCI; communicate, with the second UE in the first subband during a second time period after the first time period, second SCI associated with a third subband of the plurality of subbands, the third subband being different from the second subband based on a frequency hopping pattern; and communicate, with the second UE, second sidelink data in the third subband during the second time period based on the second SCI.

The first UE may also include one or more of the following features. For instance, the first UE may include where the first subband includes a plurality of physical sidelink control channels (PSCCHs) multiplexed in at least one of time or frequency in a first portion of the first time period; the transceiver configured to communicate the first SCI is configured to communicate, with the second UE, the first SCI in a first PSCCH of the plurality of PSCCHs; and the transceiver configured to communicate the first sidelink data is configured to communicate, with the second UE, the first sidelink data in the second subband during a second portion of the first time period after the first portion. The transceiver configured to communicate the first SCI is configured to communicate the first SCI in the first PSCCH based on a predetermined mapping between the first PSCCH and the second subband. The plurality of PSCCHs are multiplexed in time; and the transceiver configured to communicate the first SCI in the first PSCCH is configured to communicate the first SCI in the first PSCCH based on a listen-before-talk (LBT) in the first subband. The first SCI indicates a reservation for the third subband in the second time period based on the frequency hopping pattern. The first SCI indicates the frequency hopping pattern. The transceiver configured to communicate the first SCI is configured to transmit, to the second UE in the first subband, the first SCI during the first time period; the transceiver configured to communicate the first sidelink data is configured to transmit, to the second UE in the second subband, the first sidelink data during the first time period; the transceiver configured to communicate the second SCI is configured to transmit, to the second UE in the first subband, the second SCI during the second time period; and the transceiver configured to communicate the second sidelink data is configured to transmit, to the second UE in the third subband, the second sidelink data during the second time period. The first UE may include a processor configured to monitor, in the first subband, for third SCI during a third time period between the first time period and the second time period. The processor configured to monitor for the third SCI is configured to receive, from a third UE, the third SCI indicating third sidelink data destined for the first UE in a fourth subband of the plurality of subbands. The processor is further configured to switch the frontend component to at least one of a low-power mode or a power-off mode in response to a determination that there is no sidelink data destined for the first UE during the third time period based on monitoring. The first SCI indicates the at least one of the low-power mode or the power-off mode in the third time period when there is no sidelink data destined for the first UE during the third time period. The first SCI indicates a fourth subband of the plurality of subbands associated with opportunistic data reception in the third time period when there is no sidelink data destined for the first UE during the third time period; and the processor is further configured to monitor for third sidelink data in the fourth subband during the third time period in response to a determination that there is no sidelink data destined for the first UE in the third time period based on the monitoring. The transceiver is further configured to transmit an indication of a reservation collision for the fourth subband based on the determining. The second SCI further indicates a reservation for a fourth subband of the plurality of subbands during a third time period, the fourth subband being different from the first subband; and the transceiver is further configured to receive, during a fourth time period between the second time period and the third time period, an indication of a reservation collision for the fourth subband in the third time period. The first UE may include a processor configured to refrain, in response to the reservation collision, from transmitting in the fourth subband during the third time period. The transceiver is further configured to transmit, third sidelink data in the fourth subband during the third time period irrespective of the reservation collision based a priority of the third sidelink data. The transceiver is further configured to transmit, third sidelink data in the fourth subband during a portion of the third time period based on a reservation collision rule in response to the reservation collision. The first UE may include a frontend component; and a processor configured to switch the frontend component to at least one of a low-power mode or a power-off mode in the third time period in response to the reservation collision. The second SCI indicates the at least one of the low-power mode or the power-off mode in the third time period upon a detection of the reservation collision. The second SCI indicates a fifth subband of the plurality of subbands associated with opportunistic data reception in the third time period upon a detection of the reservation collision; and the first UE further includes a processor configured to monitor for third sidelink data in the fifth subband during the third time period in response to the reservation collision. The transceiver is further configured to transmit, in the first subband, third SCI during a third time period adjacent to the first time period, the third SCI indicating a fourth subband of the plurality of subbands for receiving third sidelink data and a reservation for the second subband in the first time period; and receive, in the fourth subband, the third sidelink data based on the third SCI. The transceiver configured to transmit the third SCI is configured to transmit the third SCI based on at least one of a channel busy ratio (CBR) or a channel access occupancy ratio (CR). The first SCI indicates that the second subband is for transmission during a first portion of the first time period and for reception during a second portion of the first time period, the transceiver configured to communicate the first sidelink data is configured to transmit, to the second UE in the second subband, the first sidelink data during the first portion of the first time period; and the transceiver is further configured to receive, in the second subband, third sidelink data during the second portion of the first time period.

Further aspects of the present disclosure include a non-transitory computer-readable medium having program code recorded thereon. The non-transitory computer-readable medium also includes code for causing a first user equipment (UE) to communicate, with a second UE in a first subband of a plurality of subbands within a shared radio frequency band during a first time period, first sidelink control information (SCI) associated with a second subband of the plurality of subbands. The non-transitory computer-readable medium also includes code for causing the first UE to communicate, with the second UE, first sidelink data in the second subband during the first time period based on the first SCI. The non-transitory computer-readable medium also includes code for causing the first UE to communicate, with the second UE in the first subband during a second time period after the first time period, second SCI associated with a third subband of the plurality of subbands, the third subband being different from the second subband based on a frequency hopping pattern. The non-transitory computer-readable medium also includes code for causing the first UE to communicate, with the second UE, second sidelink data in the third subband during the second time period based on the second SCI.

The non-transitory computer-readable medium may also include one or more of the following features. For instance, the non-transitory computer-readable medium may include where the first subband includes a plurality of physical sidelink control channels (PSCCHs) multiplexed in at least one of time or frequency in a first portion of the first time period; the code for causing the first UE to communicate the first SCI is configured to communicate, with the second UE, the first SCI in a first PSCCH of the plurality of PSCCHs; and the code for causing the first UE to communicate the first sidelink data is configured to communicate, with the second UE, the first sidelink data in the second subband during a second portion of the first time period after the first portion. The code for causing the first UE to communicate the first SCI is configured to communicate the first SCI in the first PSCCH based on a predetermined mapping between the first PSCCH and the second subband. The plurality of PSCCHs are multiplexed in time; and the code for causing the first UE to communicate the first SCI in the first PSCCH is configured to communicate the first SCI in the first PSCCH based on a listen-before-talk (LBT) in the first subband. The first SCI indicates a reservation for the third subband in the second time period based on the frequency hopping pattern. The first SCI indicates the frequency hopping pattern. The code for causing the first UE to communicate the first SCI is configured to transmit, to the second UE in the first subband, the first SCI during the first time period; the code for causing the first UE to communicate the first sidelink data is configured to transmit, to the second UE in the second subband, the first sidelink data during the first time period; the code for causing the first UE to communicate the second SCI is configured to transmit, to the second UE in the first subband, the second SCI during the second time period; and the code for causing the first UE to communicate the second sidelink data is configured to transmit, to the second UE in the third subband, the second sidelink data during the second time period. The program code further includes code for causing the first UE to transmit, in the first subband, third SCI during a third time period adjacent to the first time period, the third SCI indicating a fourth subband of the plurality of subbands for receiving third sidelink data and a reservation for the second subband in the first time period; and code for causing the first UE to receive, in the fourth subband, the third sidelink data based on the third SCI. The first SCI indicates that the second subband is for transmission during a first portion of the first time period and for reception during a second portion of the first time period, the code for causing the first UE to communicate the first sidelink data is configured to transmit, to the second UE in the second subband, the first sidelink data during the first portion of the first time period; and the program code further includes code for causing the first UE to receive, in the second subband, third sidelink data during the second portion of the first time period.

Further aspects of the present disclosure include a first user equipment (UE). The first user equipment includes means for communicating, with a second UE in a first subband of a plurality of subbands within a shared radio frequency band during a first time period, first sidelink control information (SCI) associated with a second subband of the plurality of subbands. The first user equipment also includes means for communicating, with the second UE, first sidelink data in the second subband during the first time period based on the first SCI. The first user equipment also includes means for communicating, with the second UE in the first subband during a second time period after the first time period, second SCI associated with a third subband of the plurality of subbands, the third subband being different from the second subband based on a frequency hopping pattern. The first user equipment also includes means for communicating, with the second UE, second sidelink data in the third subband during the second time period based on the second SCI.

The first UE may also include one or more of the following features. For instance, the first UE may include where the first subband includes a plurality of physical sidelink control channels (PSCCHs) multiplexed in at least one of time or frequency in a first portion of the first time period; the means for communicating the first SCI is configured to communicate, with the second UE, the first SCI in a first PSCCH of the plurality of PSCCHs; and the means for communicating the first sidelink data is configured to communicate, with the second UE, the first sidelink data in the second subband during a second portion of the first time period after the first portion. The means for communicating the first SCI is configured to communicate the first SCI in the first PSCCH based on a predetermined mapping between the first PSCCH and the second subband. The plurality of PSCCHs are multiplexed in time; and the means for communicating the first SCI in the first PSCCH is configured to communicate the first SCI in the first PSCCH based on a listen-before-talk (LBT) in the first subband. The first SCI indicates a reservation for the third subband in the second time period based on the frequency hopping pattern. The first SCI indicates the frequency hopping pattern. The means for communicating the first SCI is configured to transmit, to the second UE in the first subband, the first SCI during the first time period; the means for communicating the first sidelink data is configured to transmit, to the second UE in the second subband, the first sidelink data during the first time period; the means for communicating the second SCI is configured to transmit, to the second UE in the first subband, the second SCI during the second time period; and the means for communicating the second sidelink data is configured to transmit, to the second UE in the third subband, the second sidelink data during the second time period. The first UE may include means for monitoring, in the first subband, for third SCI during a third time period between the first time period and the second time period. The means for monitoring for the third SCI is configured to receive, from a third UE, the third SCI indicating third sidelink data destined for the first UE in a fourth subband of the plurality of subbands. The first UE may include means for switching a frontend component of the first UE to at least one of a low-power mode or a power-off mode in response to a determination that there is no sidelink data destined for the first UE during the third time period based on monitoring. The first SCI indicates the at least one of the low-power mode or the power-off mode in the third time period when there is no sidelink data destined for the first UE during the third time period. The first SCI indicates a fourth subband of the plurality of subbands associated with opportunistic data reception in the third time period when there is no sidelink data destined for the first UE during the third time period; and the first UE further includes means for monitoring for third sidelink data in the fourth subband during the third time period in response to a determination that there is no sidelink data destined for the first UE in the third time period based on the monitoring. The first UE may include means for monitoring for one or more SCI in the first subband during a third time period between the first time period and the second time period; means for determining, based on the monitoring, that at least two SCI are each reserving a fourth subband of the plurality of subbands in a fourth time period after the second time period; and means for transmitting an indication of a reservation collision for the fourth subband based on the determining. The second SCI further indicates a reservation for a fourth subband of the plurality of subbands during a third time period, the fourth subband being different from the first subband; and the first UE further includes means for receiving, during a fourth time period between the second time period and the third time period, an indication of a reservation collision for the fourth subband in the third time period. The first UE may include means for refraining, in response to the reservation collision, from transmitting in the fourth subband during the third time period. The first UE may include means for transmitting, third sidelink data in the fourth subband during the third time period irrespective of the reservation collision based a priority of the third sidelink data. The first UE may include means for transmitting, third sidelink data in the fourth subband during a portion of the third time period based on a reservation collision rule in response to the reservation collision. The first UE may include means for switching a frontend component of the first UE to at least one of a low-power mode or a power-off mode in the third time period in response to the reservation collision. The second SCI indicates the at least one of the low-power mode or the power-off mode in the third time period upon a detection of the reservation collision. The second SCI indicates a fifth subband of the plurality of subbands associated with opportunistic data reception in the third time period upon a detection of the reservation collision; and the first UE further includes means for monitoring for third sidelink data in the fifth subband during the third time period in response to the reservation collision. The first UE may include means for transmitting, in the first subband, third SCI during a third time period adjacent to the first time period, the third SCI indicating a fourth subband of the plurality of subbands for receiving third sidelink data and a reservation for the second subband in the first time period; and means for receiving, in the fourth subband, the third sidelink data based on the third SCI. The means for transmitting the third SCI is configured to transmit the third SCI based on at least one of a channel busy ratio (CBR) or a channel access occupancy ratio (CR). The first SCI indicates that the second subband is for transmission during a first portion of the first time period and for reception during a second portion of the first time period, the means for communicating the first sidelink data is configured to transmit, to the second UE in the second subband, the first sidelink data during the first portion of the first time period; and the first UE further includes means for receiving, in the second subband, third sidelink data during the second portion of the first time period.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
 communicating, by a first user equipment (UE) with a
  second UE in a first subband of a plurality of subbands within a shared radio frequency band during a first time period, first sidelink control information (SCI) associated with a second subband of the plurality of subbands;

communicating, by the first UE with the second UE, first sidelink data in the second subband during the first time period based on the first SCI;

communicating, by the first UE with the second UE in the first subband during a second time period after the first time period, second SCI associated with a third subband of the plurality of subbands, the third subband being different from the second subband based on a frequency hopping pattern; and communicating, by the first UE with the second UE, second sidelink data in the third subband during the second time period based on the second SCI.

2. The method of claim 1, wherein:

the first subband includes a plurality of physical sidelink control channels (PSCCHs) multiplexed in at least one of time or frequency in a first portion of the first time period;

the communicating the first SCI comprises:
communicating, by the first UE with the second UE, the first SCI in a first PSCCH of the plurality of PSCCHs; and the communicating the first sidelink data comprises:
communicating, by the first UE with the second UE, the first sidelink data in the second subband during a second portion of the first time period after the first portion.

3. The method of claim 2, wherein the communicating the first SCI in the first PSCCH is based on a predetermined mapping between the first PSCCH and the second subband.

4. The method of claim 1, wherein the first SCI indicates a reservation for the third subband in the second time period based on the frequency hopping pattern.

5. The method of claim 1, wherein the first SCI indicates the frequency hopping pattern.

6. The method of claim 1, wherein:

the communicating the first SCI comprises:
transmitting, by the first UE to the second UE in the first subband, the first SCI during the first time period;

the communicating the first sidelink data comprises:
transmitting, by the first UE to the second UE in the second subband, the first sidelink data during the first time period;

the communicating the second SCI comprises:
transmitting, by the first UE to the second UE in the first subband, the second SCI during the second time period; and the communicating the second sidelink data comprises:
transmitting, by the first UE to the second UE in the third subband, the second sidelink data during the second time period.

7. The method of claim 6, further comprising:

monitoring, by the first UE in the first subband, for third SCI during a third time period between the first time period and the second time period.

8. The method of claim 7, wherein:

the first SCI indicates a fourth subband of the plurality of subbands associated with opportunistic data reception in the third time period when there is no sidelink data destined for the first UE during the third time period; and the method further comprises:
monitoring, by the first UE, for third sidelink data in the fourth subband during the third time period in response to determining, from the monitoring, that there is no sidelink data destined for the first UE in the third time period.

9. The method of claim 6, further comprising:

monitoring, by the first UE, for one or more SCI in the first subband during a third time period between the first time period and the second time period;

determining, by the first UE based on the monitoring, that at least two SCI are each reserving a fourth subband of the plurality of subbands in a fourth time period after the second time period; and transmitting, by the first UE, an indication of a reservation collision for the fourth subband based on the determining.

10. The method of claim 6, wherein:

the second SCI further indicates a reservation for a fourth subband of the plurality of subbands during a third time period, the fourth subband being different from the first subband; and the method further comprises:
receiving, by the first UE during a fourth time period between the second time period and the third time period, an indication of a reservation collision for the fourth subband in the third time period.

11. The method of claim 10, further comprising:

refraining, by the first UE in response to the reservation collision, from transmitting in the fourth subband during the third time period.

12. The method of claim 10, further comprising:

transmitting, by the first UE, third sidelink data in the fourth subband during the third time period irrespective of the reservation collision based a priority of the third sidelink data.

13. The method of claim 10, further comprising:

transmitting, by the first UE, third sidelink data in the fourth subband during a portion of the third time period based on a reservation collision rule in response to the reservation collision.

14. The method of claim 1, further comprising:

transmitting, by the first UE in the first subband, third SCI during a third time period adjacent to the first time period, the third SCI indicating a fourth subband of the plurality of subbands for receiving third sidelink data and a reservation for the second subband in the first time period; and receiving, by the first UE in the fourth subband, the third sidelink data based on the third SCI.

15. The method of claim 1, wherein:

the first SCI indicates that the second subband is for transmission during a first portion of the first time period and for reception during a second portion of the first time period, the communicating the first sidelink data comprises:
transmitting, by the first UE to the second UE in the second subband, the first sidelink data during the first portion of the first time period; and the method further comprises:
receiving, by the first UE in the second subband, third sidelink data during the second portion of the first time period.

16. A first user equipment (UE) comprising:

a processor; and a transceiver coupled to the processor, wherein the transceiver is configured to:

communicate, with a second UE in a first subband of a plurality of subbands within a shared radio frequency band during a first time period, first sidelink control information (SCI) associated with a second subband of the plurality of subbands;

communicate, with the second UE, first sidelink data in the second subband during the first time period based on the first SCI;

communicate, with the second UE in the first subband during a second time period after the first time period, second SCI associated with a third subband of the plurality of subbands, the third subband being different from the second subband based on a frequency hopping pattern; and communicate, with the second UE, second sidelink data in the third subband during the second time period based on the second SCI.

17. The first UE of claim 16, wherein:
the first subband includes a plurality of physical sidelink control channels (PSCCHs) multiplexed in at least one of time or frequency in a first portion of the first time period;
the transceiver configured to communicate the first SCI is configured to:
communicate, with the second UE, the first SCI in a first PSCCH of the plurality of PSCCHs, wherein the first SCI indicates the frequency hopping pattern; and
the transceiver configured to communicate the first sidelink data is configured to:
communicate, with the second UE, the first sidelink data in the second subband during a second portion of the first time period after the first portion.

18. The first UE of claim 16, wherein:
the transceiver configured to communicate the first SCI is configured to:
transmit, to the second UE in the first subband, the first SCI during the first time period;
the transceiver configured to communicate the first sidelink data is configured to:
transmit, to the second UE in the second subband, the first sidelink data during the first time period;
the transceiver configured to communicate the second SCI is configured to:
transmit, to the second UE in the first subband, the second SCI during the second time period; and
the transceiver configured to communicate the second sidelink data is configured to:
transmit, to the second UE in the third subband, the second sidelink data during the second time period.

19. The first UE of claim 18, wherein the processor is further configured to:
monitor, in the first subband, for third SCI during a third time period between the first time period and the second time period.

20. The first UE of claim 19, wherein:
the first SCI indicates a fourth subband of the plurality of subbands associated with opportunistic data reception in the third time period when there is no sidelink data destined for the first UE during the third time period; and
the processor is further configured to:
monitor for third sidelink data in the fourth subband during the third time period in response to a determination that there is no sidelink data destined for the first UE in the third time period based on the monitoring.

21. The first UE of claim 18, wherein the processor is further configured to:
monitor for one or more SCI in the first subband during a third time period between the first time period and the second time period; and
determine, based on the monitoring, that at least two SCI are each reserving a fourth subband of the plurality of subbands in a fourth time period after the second time period, and
wherein the transceiver is further configured to:
transmit an indication of a reservation collision for the fourth subband based on the determining.

22. The first UE of claim 18, wherein:
the second SCI further indicates a reservation for a fourth subband of the plurality of subbands during a third time period, the fourth subband being different from the first subband; and
the transceiver is further configured to:
receive, during a fourth time period between the second time period and the third time period, an indication of a reservation collision for the fourth subband in the third time period.

23. The first UE of claim 16, wherein the transceiver is further configured to:
transmit, in the first subband, third SCI during a third time period adjacent to the first time period, the third SCI indicating a fourth subband of the plurality of subbands for receiving third sidelink data and a reservation for the second subband in the first time period; and
receive, in the fourth subband, the third sidelink data based on the third SCI.

24. The first UE of claim 16, wherein:
the first SCI indicates that the second subband is for transmission during a first portion of the first time period and for reception during a second portion of the first time period,
the transceiver configured to communicate the first sidelink data is configured to:
transmit, to the second UE in the second subband, the first sidelink data during the first portion of the first time period; and
the transceiver is further configured to:
receive, in the second subband, third sidelink data during the second portion of the first time period.

25. A non-transitory computer-readable medium having program code recorded thereon, the program code comprising:
code for causing a first user equipment (UE) to communicate, with a second UE in a first subband of a plurality of subbands within a shared radio frequency band during a first time period, first sidelink control information (SCI) associated with a second subband of the plurality of subbands;
code for causing the first UE to communicate, with the second UE, first sidelink data in the second subband during the first time period based on the first SCI;
code for causing the first UE to communicate, with the second UE in the first subband during a second time period after the first time period, second SCI associated with a third subband of the plurality of subbands, the third subband being different from the second subband based on a frequency hopping pattern; and
code for causing the first UE to communicate, with the second UE, second sidelink data in the third subband during the second time period based on the second SCI.

26. The non-transitory computer-readable medium of claim 25, wherein:
the first subband includes a plurality of physical sidelink control channels (PSCCHs) multiplexed in at least one of time or frequency in a first portion of the first time period;
the code for causing the first UE to communicate the first SCI is configured to:
communicate, with the second UE, the first SCI in a first PSCCH of the plurality of PSCCHs; and
the code for causing the first UE to communicate the first sidelink data is configured to:
communicate, with the second UE, the first sidelink data in the second subband during a second portion of the first time period after the first portion.

27. The non-transitory computer-readable medium of claim 25, wherein:
the code for causing the first UE to communicate the first SCI is configured to:
transmit, to the second UE in the first subband, the first SCI during the first time period;
the code for causing the first UE to communicate the first sidelink data is configured to:
transmit, to the second UE in the second subband, the first sidelink data during the first time period;
the code for causing the first UE to communicate the second SCI is configured to:
transmit, to the second UE in the first subband, the second SCI during the second time period;
the code for causing the first UE to communicate the second sidelink data is configured to:
transmit, to the second UE in the third subband, the second sidelink data during the second time period; and
code for causing the first UE to monitor, in the first subband, for third SCI during a third time period between the first time period and the second time period.

28. A first user equipment (UE) comprising:
means for communicating, with a second UE in a first subband of a plurality of subbands within a shared radio frequency band during a first time period, first sidelink control information (SCI) associated with a second subband of the plurality of subbands;
means for communicating, with the second UE, first sidelink data in the second subband during the first time period based on the first SCI;
means for communicating, with the second UE in the first subband during a second time period after the first time period, second SCI associated with a third subband of the plurality of subbands, the third subband being different from the second subband based on a frequency hopping pattern; and
means for communicating, with the second UE, second sidelink data in the third subband during the second time period based on the second SCI.

29. The first UE of claim 28, wherein:
the first subband includes a plurality of physical sidelink control channels (PSCCHs) multiplexed in at least one of time or frequency in a first portion of the first time period;
the means for communicating the first SCI is configured to:
communicate, with the second UE, the first SCI in a first PSCCH of the plurality of PSCCHs; and
the means for communicating the first sidelink data is configured to:
communicate, with the second UE, the first sidelink data in the second subband during a second portion of the first time period after the first portion.

30. The first UE of claim 28, wherein:
the means for communicating the first SCI is configured to:
transmit, to the second UE in the first subband, the first SCI during the first time period;
the means for communicating the first sidelink data is configured to:
transmit, to the second UE in the second subband, the first sidelink data during the first time period;
the means for communicating the second SCI is configured to:
transmit, to the second UE in the first subband, the second SCI during the second time period;
the means for communicating the second sidelink data is configured to:
transmit, to the second UE in the third subband, the second sidelink data during the second time period; and
the first UE further comprises:
means for monitoring, in the first subband, for third SCI during a third time period between the first time period and the second time period.

* * * * *